US012581540B2

(12) United States Patent
Khan et al.

(10) Patent No.: US 12,581,540 B2
(45) Date of Patent: Mar. 17, 2026

(54) RANDOM ACCESS TYPE DETERMINATION AND WD CAPABILITY SIGNALING IN NR NTN

(71) Applicant: Telefonaktiebolaget LM Ericsson (publ), Stockholm (SE)

(72) Inventors: Talha Khan, Santa Clara, CA (US); Xingqin Lin, Santa Clara, CA (US); Zhipeng Lin, Nanjing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 495 days.

(21) Appl. No.: 18/009,780

(22) PCT Filed: Jun. 9, 2021

(86) PCT No.: PCT/SE2021/050554
§ 371 (c)(1),
(2) Date: Dec. 12, 2022

(87) PCT Pub. No.: WO2021/251888
PCT Pub. Date: Dec. 16, 2021

(65) Prior Publication Data
US 2023/0284275 A1 Sep. 7, 2023

Related U.S. Application Data

(60) Provisional application No. 63/038,155, filed on Jun. 12, 2020.

(51) Int. Cl.
*H04W 74/0833* (2024.01)
*H04W 74/0838* (2024.01)
*H04W 74/0836* (2024.01)

(52) U.S. Cl.
CPC .... *H04W 74/0833* (2013.01); *H04W 74/0836* (2024.01); *H04W 74/0838* (2024.01)

(58) Field of Classification Search
CPC ................................................. H04W 74/0833
See application file for complete search history.

(56) References Cited

U.S. PATENT DOCUMENTS

2013/0242730 A1* 9/2013 Pelletier ................ H04L 5/0053
370/230
2020/0413451 A1* 12/2020 Taherzadeh Boroujeni ...............
H04W 56/005
2022/0159741 A1* 5/2022 Hoang .................. H04W 74/08

FOREIGN PATENT DOCUMENTS

WO 2019161044 A1 8/2019

OTHER PUBLICATIONS

3GPP TSG RAN WG1 Meeting #98 R1-1908250 (Year: 2019).*
(Continued)

*Primary Examiner* — Ricky Q Ngo
(74) *Attorney, Agent, or Firm* — Weisberg I.P. Law, P.A.

(57) ABSTRACT

In one embodiment, a method implemented in a wireless device, WD, includes receiving at least one first random access, RA, indicator that indicates information relating to a non-terrestrial network, NTN, access; and determining a random access, RA, based at least in part on the at least one first RA indicator. In one embodiment, a method implemented by a network node includes sending at least one first random access, RA, indicator that indicates information relating to a non-terrestrial network, NTN, access; and allowing the WD to perform a random access, RA, that is based at least in part on the at least one first RA indicator.

14 Claims, 22 Drawing Sheets

(56) References Cited

OTHER PUBLICATIONS

International Search Report and Written Opinion dated Sep. 22, 2021 for International Application No. PCT/SE2021/050554 filed Jun. 9, 2021, consisting of 15-pages.

Lin, Xingqin et al.; 5G New Radio Evolution Meets Satellite Communications: Opportunities, Challenges, and Solutions; arXiv preprint arXiv:1903.11219; Mar. 2019, consisting of 8-pages.

3GPP TR 38.811 V15.2.0; 3rd Generation Partnership Project; Technical Specification Group Radio Access Network; Study on New Radio (NR) to support non-terrestrial networks (Release 15); Sep. 2019, consisting of 126-pages.

3GPP TR 38.821 V16.0.0; 3rd Generation Partnership Project; Technical Specification Group Radio Access Network; Solutions for (NR) to support non-terrestrial networks (NTN) (Release 16); Dec. 2019, consisting of 140-pages.

ETSI TS 138 211 V15.8.0; 5G; NR; Physical channels and modulation (3GPP TS 38.211 version 15.8.0 Release 15); Jan. 2020, consisting of 100-pages.

ETSI TS 138 213 V15.3.0; 5G; NR; Physical layer procedures for control (3GPP TS 38.213 version 15.3.0 Release 15); Oct. 2018, consisting of 102-pages.

3GPP TSG RAN meeting #86 RP-193234 revision from RP-192502, 3144; Title: Solutions for NR to support non-terrestrial networks (NTN); Agenda Item: 9.1.2—Proposals led by RAN2; Source: Thales; Type: WID new; Document for: Approval; Release: Rel-17; Date and Location: Dec. 9-13, 2019, Sitges, Spain, consisting of 10-pages.

3GPP TSG RAN Meeting #86 RP-193235 (revision of xx-yyxxxx); Title: New Study WID on NB-IoT/eTMC support for NTN; Agenda Item: xxx; Source: MediaTek Inc.; Document for: Approval; Date and Location: Dec. 9-31, 2019, Sitges, Spain, consisting of 4-pages.

3GPP TSG RAN WG1 Meeting #95 R1-1813661; Title: Discussion on random access procedure for NTN; Agenda Item: 7.2.12; Source: Huawei, HiSilicon; Document for: Discussion; Date and Location: Nov. 12-16, 2018, Spokane, USA, consisting of 2-pages.

3GPP TSG RAN WG1 Meeting #98 R1-1908250; Title: Considerations on Doppler Compensation, Uplink Timing Advance and Random Access in NTN; Agenda Item: 7.2.5.3; Source: Nokia, Nokia Shanghai Bell; Document for: Discussion and Decision; Date and Location: Aug. 26-30, 2019, Prague, Czech Republic, consisting of 21-pages.

* cited by examiner

1

RANDOM ACCESS TYPE DETERMINATION AND WD CAPABILITY SIGNALING IN NR NTN

CROSS-REFERENCE TO RELATED APPLICATIONS

This application is a Submission Under 35 U.S.C. § 371 for U.S. National Stage Patent Application of International Application No.: PCT/SE2021/050554, filed Jun. 9, 2021 entitled "RANDOM ACCESS TYPE DETERMINATION AND WD CAPABILITY SIGNALING IN NR NTN," which claims priority to U.S. Provisional Application No. 63/038,155, filed Jun. 12, 2020, entitled "RANDOM ACCESS TYPE DETERMINATION AND UE CAPABIL- ITY SIGNALING IN NR NTN," the entireties of both of which are incorporated herein by reference.

TECHNICAL FIELD

The present disclosure relates to wireless communication and in particular, to random access type determination and wireless device (WD) capability signaling in New Radio (NR) Non-Terrestrial Network (NTN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodi- ments will be apparent from the following description.

In $3^{rd}$ Generation Partnership Project (3GPP) Release 8, the Evolved Packet System (EPS) was specified. EPS is based on the Long-Term Evolution (LTE) radio network and the Evolved Packet Core (EPC). It was originally intended to provide voice and mobile broadband (MBB) services but has continuously evolved to broaden its functionality. Since Release 13 Narrowband Internet-of-Things (NB-IoT) and LTE Machine type (LTE-M) are part of the LTE specifica- tions and provide connectivity to massive machine type communications (mMTC) services.

In 3GPP Release 15, the first release of the $5^{th}$ Generation (5G, also called New Radio or NR) system (5GS) was specified. This is a new generation's radio access technology intended to serve use cases such as enhanced mobile broad- band (eMBB), ultra-reliable and low latency communication (URLLC) and mMTC. 5G includes the New Radio (NR) access stratum interface and the 5G Core Network (5GC). The NR physical and higher layers are reusing parts of the LTE specification, and to that add needed components when motivated by new use cases. One such component is the introduction of a sophisticated framework for beam forming and beam management to extend the support of the 3GPP technologies to a frequency range going beyond 6 GHz.

In Release 15, 3GPP started the work to prepare NR for operation in a Non-Terrestrial Network (NTN). The work was performed within the study item "NR to support Non- Terrestrial Networks" and resulted in 3GPP Technical Report (TR) 38.811. In Release 16, the work to prepare NR for operation in an NTN network continued with the study item "Solutions for NR to support Non-Terrestrial Net- work". In parallel the interest to adapt NB-IoT and LTE-M for operation in NTN is growing. As a consequence, 3GPP Release 17 contains both a work item on NR NTN and a study item on NB-IoT and LTE-M support for NTN.

The following sections provide a brief description on the satellite communication and the background of random access procedures specified in NR release 15 and 16.

Satellite Communications

A satellite radio access network usually includes the following components:

A satellite that refers to a space-borne platform.

An earth-based gateway that connects the satellite to a base station or a core network, depending on the choice of architecture.

Feeder link that refers to the link between a gateway and a satellite

Service link that refers to the link between a satellite and a WD (also called user equipment or UE).

Depending on the orbit altitude, a satellite may be cat- egorized as low earth orbit (LEO), medium earth orbit (MEO), or geostationary earth orbit (GEO) satellite:

LEO: typical heights ranging from 250-1,500 km, with orbital periods ranging from 90-120 minutes.

MEO: typical heights ranging from 5,000-25,000 km, with orbital periods ranging from 3-15 hours.

GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth- fixed with some beam pointing mechanism used by the satellite to compensate for its motion. The size of a spotbeam depends on the system design, which may range from tens of kilometers to a few thousands of kilometers.

FIG. 1 shows an example architecture of a satellite network with bent pipe transponders. The depicted elevation angle of the service link is important as it impacts the distance between the satellite and the device, and the veloc- ity of the satellite relative to the device. In 3GPP, it has been assumed that the service link is operational for elevation angles exceeding a threshold of 10 degrees. Different loca- tions within a cell will observe different elevation angles at a given time.

In an earth-fixed beam LEO or MEO NTN providing continuous coverage, a WD will be served by the same beam as long as the WD is in the coverage area of the satellite. Handover to a new satellite fulfilling the elevation angle threshold is to be performed when the elevation angle to the currently serving satellite approaches the elevation angle threshold. The handover rate may be frequent, and it has been considered that an inter-satellite handover may be required every 450 seconds for a LEO constellation at 600 km altitude.

For LEO or MEO constellations using earth moving beams the WD will be served by the beam that currently passes the WD location. The WD will be sequentially served by a series of beams of the same satellite as the coverage area of the satellite passes the WD. After that, the WD will be served by a series of beams of a different satellite, etc. Thus, switching between satellite beams is even more frequent. It has been considered that for a LEO constellation at 600 km altitude based on earth moving beams a handover between spotbeams may be required every 10 seconds.

Unlike the situation in terrestrial networks, the service link in NTN is typically line-of-sight (LoS) and therefore the pathloss is mainly dependent on the satellite-WD distance. Due to the geometry, the pathloss does not differ dramatically between the different beams of a satellite, e.g., a pathloss range in the order of 10 dB can be expected within the coverage area of a LEO satellite at 600 km altitude. The spotbeam selectivity is mainly due to the directivity of the antenna lobes. The antenna lobes are approximately symmetric around each beam's center point on Earth. It may therefore be feasible that cell selection/reselection is based on which spotbeam center that is closest to the WD. The WD can calculate its distance to each beam center and perform distance-based cell selection/reselection using information of ephemeris and beam constellation of nearby NTN satellites together with WD location.

NR Cell Search and System Information Acquisition

In NR, the combination of synchronization signals (SS) and physical broadcast channel (PBCH) is referred to as a SS/PBCH block (SSB). Similar to LTE, a pair of SS, primary synchronization signal (PSS) and secondary synchronization signal (SSS), is periodically transmitted on downlink from each cell to allow a WD to initially access to the network. By detecting SS, a WD can obtain the physical cell identity, achieve downlink synchronization in both time and frequency, and acquire the timing for PBCH. PBCH carries the master information block (MIB), which contains minimum system information that a WD needs to acquire system information block 1 (SIB1). SIB1 carries the remaining minimum system information that is needed for a WD to be able to perform subsequent random-access procedure.

NR Random Access Procedure

Two types of random access (RA) procedure are supported: 4-step RA type with Msg1 and 2-step RA type with MsgA. Both types of RA procedure support contention-based random access (CBRA) and contention-free random access (CFRA).

Contention-Based

The 4-step contention based random access procedure, also referred to as Type-1 random access procedure in 3GPP Technical Specification (TS) 38.213, is illustrated in FIG. 2. In the first step, a WD initiates the random-access procedure by transmitting in uplink (UL) a random-access preamble (Msg1) on a physical random-access channel (PRACH). After detecting the Msg1, the gNB will respond by transmitting in downlink (DL) a random-access response (RAR) on a PDSCH (Msg2). In the third step, after successfully decoding Msg2, the WD continues the procedure by transmitting in UL a PUSCH (Msg3) for terminal identification and radio resource control (RRC) connection establishment request. In the last step of the Type-1 procedure, the gNB transmits in DL a PDSCH (Msg4) for contention resolution.

There can be cases that multiple WDs select the same random-access preamble and transmit the preamble on the same PRACH time/frequency resource. This preamble collision is called contention. One of the main purposes of applying Step 3 and Step 4 is to resolve such potential contention.

The 2-step random access procedure, also referred to as Type-2 random access procedure in TS 38.213, is illustrated in FIG. 3. In the first step, a WD sends a message A including random access preamble together with higher layer data such as RRC connection request possibly with some small payload on a physical uplink shared channel (PUSCH). After detecting the MsgA, the network (e.g., gNB) sends a RAR (also called message B) including a WD identifier assignment, timing advance information, and contention resolution message, etc.

Contention-Free

CFRA procedure is illustrated in FIG. 4, where the network (e.g., gNB) assigns a preamble for CFRA in 4-step RACH or preamble and PUSCH for CFRA in 2-step RACH, and the network does not configure CFRA resources for 4-step and 2-step RA types at the same time for a Bandwidth Part (BWP). And CFRA with 2-step RA type is only supported for handover.

The Msg1 of 4-step RA includes only a preamble on PRACH, while the MsgA of the 2-step RA type includes a preamble on PRACH and a payload on PUSCH. After Msg1 transmission or MsgA transmission, WD monitors for a response from the network within a configured window. For CFRA, upon receiving the network response, the WD ends the random access procedure.

NR Rel-15 PRACH Configuration

In NR, the time and frequency resource on which a random-access preamble (Msg1) is transmitted is defined as a PRACH occasion.

The time resources and preamble format for the Msg1 transmission is configured by a PRACH configuration index, which indicates a row in a PRACH configuration table specified in 3GPP TS 38.211 Tables 6.3.3.2-2, 6.3.3.2-3, 6.3.3.2-4 for frequency 1 (FR1) paired spectrum, FR1 unpaired spectrum and frequency 2 (FR2) with unpaired spectrum, respectively.

Part of the Table 6.3.3.2-3 for FR1 unpaired spectrum for preamble format 0 is copied in Table 1 below, where the value of x indicates the PRACH configuration period in number of system frames. The value of y indicates the system frame within each PRACH configuration period on which the PRACH occasions are configured. For instance, if y is set to 0, then, it means PRACH occasions are only configured in the first frame of each PRACH configuration period. The values in the column "subframe number" tells on which subframes are configured with PRACH occasion. The values in the column "starting symbol" is the symbol index In case of TDD, semi-statically configured DL parts and/or actually transmitted SSBs can override and invalidate some time-domain PRACH occasions defined in the PRACH configuration table. More specifically, PRACH occasions in the UL part are always valid, and a PRACH occasion within the flexible part is valid as long as it does not precede or collide with an SSB in the RACH slot and it is at least N symbols after the DL part and the last symbol of an SSB, where N is 0 or 2 depending on PRACH format and subcarrier spacing.

TABLE 1

PRACH configuration for preamble format 0 for FR1 unpaired spectrum.

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | — | — | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8.9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

In the frequency domain, NR supports multiple frequency-multiplexed PRACH occasions on the same time-domain PRACH occasion. This is mainly motivated by the support of analog beam sweeping in NR such that the PRACH occasions associated to one SSB are configured at the same time instance but different frequency locations. The starting position in the frequency is indicated by the higher-layer parameter msg1-FrequencyStart in SIB1, and the number of consecutive PRACH occasions frequency-multiplexed (FDMed) in one time instance is configured by the higher-layer parameter msg1-FDM in SIB1. The number of PRACH occasions FDMed in one time-domain PRACH occasion, can be 1, 2, 4, or 8.

In NR Rel-15, there are up to 64 sequences that can be used as random-access preambles per PRACH occasion in each cell. The RRC parameter totalNumberOfRA-Preambles determines how many of these 64 sequences are used as random-access preambles per PRACH occasion in each cell. The 64 sequences are configured by including firstly all the available cyclic shifts of a root Zadoff-Chu sequence, and secondly in the order of increasing root index, until 64 preambles have been generated for the PRACH occasion.

NR Rd-15 Association Between SSB and PRACH Occasion

NR Rel-15 supports one-to-one, one-to-many, and many-to-one association between SSB and PRACH Occasions, as illustrated in FIG. 6 and FIG. 7.

The preambles associated to each SSB is configured by the two RRC parameters in the RACH-ConfigCommon: ssb-perRACH-OccasionAndCB-PreamblesPerSSB and totalNumberOfRA-Preambles.

The detailed mapping rule is specified in TS 38.213 section 8.1. FIG. 8 shows an example of the mapping between SSBs and preambles in different PRACH occasions. In the example in FIG. 8, the following are used:

PRACH format A3 (2 TD occs./slot);
PRACH config. period=20 ms;
2 PRACH slots per config. period;
PRACH FDMed=2;
SSBs=8;
SSB-perPRACH-Occasion=2; and
totalNumberOfRA-preambles=64.

For each SSB, the associated preambles per PRACH occasion $N_{preamble}^{total}/N$ are, further divided into two sets for CBRA and CFRA. The number of CB preambles per SSB per PRACH occasion, R, is signaled by the RRC parameter ssb-perRACH-OccasionAndCB-PreamblesPerSSB. Preamble indices for CBRA and CFRA are mapped consecutively for one SSB in one PRACH occasion, as shown in FIG. 9. In the example in FIG. 9, the following are used:

SSB-perPRACH-Occasion=2;
totalNumberOfRA-preambles=64; and
CB-preambles-per-SSB=8.

If Random Access Preambles group B is configured for CBRA, then, amongst the CBRA preambles (#CB-preambles-per-SSB) associated with an SSB, the first numberOfRA-PreamblesGroupA Random Access Preambles belong to Random Access Preambles group A, and the remaining Random Access Preambles associated with the SSB belong to Random Access Preambles group B. FIG. 10 shows an example, when Random Access Preambles group B is configured for CBRA. In the example:

SSB-perPRACH-Occasion=2;
totalNumberOfRA-preambles=64;
CB-preambles-per-SSB=8; and
numberofRA-PreamblesGroupA=6.

According to TS 38.213, one of the two conditions must be met in order for a WD to select Random Access Preambles group B for PRACH transmission:

Condition 1: potential Msg3 size (UL data available for transmission plus a medium access control (MAC) header and, where required, MAC control elements (CEs)) is greater than ra-Msg3SizeGroupA and the pathloss is less than PCMAX (of the Serving Cell performing the Random Access Procedure)-pream-bleReceivedTargetPower-msg3-DeltaPreamble-mes-sagePowerOffsetGroupB; or Condition 2: the Random Access procedure was initiated for the common control channel (CCCH) logical chan-nel and the CCCH service data unit (SDU) size plus MAC subheader is greater than ra-Msg3SizeGroupA.

NR Rel-16 for MsgA Configuration

MsgA Preamble Configuration

In NR Rel-16, the RACH occasions for 2-step RACH can be either separately configured (also known as Type-2 random access procedure with separate configuration of PRACH occasions with Type-1 random access procedure) or are shared with 4-step RACH (also known as Type-2 random access procedure with common configuration of PRACH occasions with Type-1 random access procedure) in which case different sets of preamble IDs will be used.

For Type-2 random access procedure with common con-figuration of PRACH occasions with Type-1 random access procedure, a WD is provided a number N of SS/PBCH blocks associated with one PRACH occasion by ssb-per-RACH-OccasionAndCB-PreamblesPerSSB and a number Q of contention-based preambles per SS/PBCH block per valid PRACH occasion by msgA-CB-PreamblesPerSSB. The PRACH transmission can be on a subset of PRACH occa-sions associated with a same SS/PBCH block index for a WD provided with a PRACH mask index by msgA-ssb-sharedRO-MaskIndex. An example of the SSB to Random Access Occasion (RO) mapping and the preamble allocation is provided in FIG. 11. Note that only one preamble group is assumed in this example, which uses:

SSBs-per-PRACH-occasion=4;
CB-preambles-per-SSB=4; and
msgA-CB-PreamblesPerSSB=2.

For Type-2 random access procedure with separate con-figuration of PRACH occasions with Type-1 random access procedure, a WD is provided a number N of SS/PBCH blocks associated with one PRACH occasion and a number R of contention-based preambles per SS/PBCH block per valid PRACH occasion by ssb-perRACH-OccasionAndCB-PreamblesPerSSB-msgA when provided; otherwise, by ssb-perRACH-OccasionAndCB-PreamblesPerSSB. Since the SSB to RO mapping and the preamble allocation are inde-pendently configured, the example provided for 4-step RACH in FIG. 10 is also valid for this case of 2-step RACH except that the parameters are separately configured for 2-step RACH.

8

MsgA PUSCH Configuration

A PUSCH occasion is defined as the time frequency resource used for one PUSCH transmission. For one MsgA PUSCH occasion, one or more demodulation reference signal (DMRS) resources can be configured, one of which will be selected for each PUSCH transmission within the PUSCH occasion.

A set of PUSCH occasions are configured per MsgA PUSCH configuration which are relative to and mapped by a group of preambles in a set of ROs in one PRACH slot. A mapping between one or multiple PRACH preambles and a PUSCH occasion associated with a DMRS resource is according to the mapping order as described below.

Each consecutive number of $N_{preamble}$ preamble indexes from valid PRACH occasions in a PRACH slot as follows:

first, in increasing order of preamble indexes within a single PRACH occasion second, in increasing order of frequency resource indexes for frequency multiplexed PRACH occasions;

third, in increasing order of time resource indexes for time multiplexed PRACH occasions within a PRACH slot are mapped to a valid PUSCH occasion and the asso-ciated DMRS resource;

first, in increasing order of frequency resource indexes $f_{id}$ for frequency multiplexed PUSCH occasions;

second, in increasing order of DMRS resource indexes within a PUSCH occasion, where a DMRS resource index $DMRS_{id}$ is determined first in an ascending order of a DMRS port index and second in an ascending order of a DMRS sequence index (see e.g., TS 38.211);

third, in increasing order of time resource indexes $t_{id}$ for time multiplexed PUSCH occasions within a PUSCH slot; and fourth, in increasing order of indexes for $N_s$ PUSCH slots; where $N_{preamble}=\text{ceil}(T_{preamble}/T_{PUSCH})$, $T_{preamble}$ is a total number of valid PRACH occasions per association pattern period multiplied by the number of preambles per valid PRACH occasion provided by msgA-PUSCH-Preamble-Group, and $T_{PUSCH}$ is a total number of valid PUSCH occasions per PUSCH configuration per association pattern period multiplied by the number of DMRS resource indexes per valid PUSCH occasion provided by msgA-DMRS-Config.

There currently exist certain challenges. The NR standard has been designed with terrestrial networks (TNs) in mind. However, there is a desire to support NTNs.

SUMMARY

According to an aspect of the present disclosure, a method implemented in a wireless device, WD, configured to com-municate with a network node is provided. The method includes receiving at least one first random access, RA, indicator that indicates information relating to a non-terres-trial network, NTN, access; and determining a random access, RA, based at least in part on the at least one first RA indicator.

In some embodiments of this aspect, the at least one first RA indicator indicates a first PRACH format to use to access the NTN. In some embodiments of this aspect, the at least one first RA indicator indicates a first random access, RA, procedure to use to access the NTN. In some embodiments of this aspect, the method further includes receiving at least one second RA indicator that indicates information relating to a terrestrial network, TN, access; and one or more of: the at least one first RA indicator is different from the at least one second RA indicator, the at least one second RA indicator being to access to the TN and the NTN; the first PRACH format to use to access the NTN is different from a second PRACH format to use to access the TN, the second PRACH format being also to access the NTN; and/or the first RA procedure to use to access the NTN is different from a second RA procedure to use to access the TN, the second RA procedure being also to access the NTN.

In some embodiments of this aspect, the method further includes associating a first WD capability with a second WD capability from a predetermined set of a plurality of capability types. In some embodiments of this aspect, the plurality of capability types comprises one or more of: a first type indicating that the WD does not support a global navigation satellite system, GNSS; a second type indicating that the WD supports the GNSS and is incapable of uplink time and/or frequency pre-compensation before initiating a random access, RA, procedure; and a third type indicating that the WD supports the GNSS and is capable of uplink time and/or frequency pre-compensation before initiating the RA procedure.

In some embodiments of this aspect, associating the first WD capability with the second WD capability comprises associating a capability to support a 2-step RA procedure with a capability to perform a random access, RA, procedure to access the NTN without an uplink time and/or frequency pre-compensation. In some embodiments of this aspect, associating the first WD capability with the second WD capability comprises associating a capability to support a shared spectrum channel access with a capability to perform a random access, RA, procedure to access the NTN without an uplink time and/or frequency pre-compensation. In some embodiments of this aspect, the at least one first RA indicator comprises a parameter that identifies a PRACH format to use to access the NTN and an RA procedure to use to access the NTN, the parameter being a part of a predetermined set of a plurality of parameters.

In some embodiments of this aspect, the plurality of parameters comprises one or more of: a first parameter that identifies a first PRACH format to use to access the NTN and a first RA procedure to use to access the NTN, the first PRACH format being specific to the NTN access and the first RA procedure being also for a terrestrial network, TN; a second parameter that identifies a second PRACH format to use to access the NTN and a second RA procedure to use to access the NTN, the second PRACH format being also for TN access and the second RA procedure being specific to NTN access; and a third PRACH format to use to access the NTN and a third RA procedure to use to access the NTN, the third PRACH format being specific to NTN access and the third RA procedure being specific to NTN access.

In some embodiments of this aspect, one or more of: the first and/or third PRACH formats that are specific to the NTN access are based on two Zadoff-Chu sequences; the second PRACH format that is also for TN access is based on a single Zadoff-Chu sequence; the second and/or third RA procedures that are specific to the NTN access comprise a modification to an RA procedure for TN access; and the first RA procedure that is also for TN access is one of a 4-step and a 2-step RA procedure. In some embodiments of this aspect, the modification comprises an uplink time and/or frequency pre-compensation to be performed before initiation of the RA procedure. In some embodiments of this aspect, at least one of the at least one first RA indicator that indicates information relating to the NTN access is received in one of: a radio resource control, RRC, signaling; a cell specific signaling; and a WD specific signaling.

In some embodiments of this aspect, the at least one first RA indicator comprises a first information that is broadcasted in system information, SI, and a second information that indicates a physical random access channel, PRACH, configuration that is specific to the NTN access. In some embodiments of this aspect, the first information that is broadcasted in the SI indicates whether WDs with a global navigation satellite system, GNSS, capability are allowed to use the PRACH configuration that is specific to the NTN access. In some embodiments of this aspect, the at least one first RA indicator comprises information that indicates whether a serving cell provided by the network node supports a NTN specific random access, RA, type. In some embodiments of this aspect, the at least one first RA indicator comprises information that indicates a common physical random access channel, PRACH, configuration within at least one of a common PRACH configuration information element, IE, and a bandwidth part, BWP, uplink common information element, IE.

In some embodiments of this aspect, the at least one first RA indicator comprises information that indicates a dedicated physical random access channel, PRACH, configuration within at least one of a dedicated PRACH configuration information element, IE, and a bandwidth part, BWP, uplink common information element, IE. In some embodiments of this aspect, determining the RA based at least in part on the at least one first RA indicator comprises determining an RA type to initiate access to the NTN to be one of an NTN-specific RA type and a conventional TN RA type, the one of the NTN-specific RA type and the conventional TN RA type to initiate access to the NTN being based at least in part on whether the RA is a contention-free or contention-based. In some embodiments of this aspect, when the RA is contention-free, determining the RA type to initiate access to the NTN based at least in part on a global navigation satellite system, GNSS, capability of the WD.

In some embodiments of this aspect, when the RA is contention-based, determining the RA type to initiate access to the NTN based at least in part on an assumption that different physical random access channel, PRACH, resources are used for the NTN-specific RA type and the conventional TN RA type. In some embodiments of this aspect, determining the RA based at least in part on the at least one first RA indicator comprises: performing the RA to the NTN using at least one of the at least one first RA indicator.

According to an aspect of the present disclosure, a method implemented by a network node configured to communicate with a wireless device, WD, is provided. The method comprising sending at least one first random access, RA, indicator that indicates information relating to a non-terrestrial network, NTN, access; and allowing the WD to perform a random access, RA, that is based at least in part on the at least one first RA indicator.

In some embodiments of this aspect, the at least one first RA indicator indicates a first PRACH format to use to access the NTN. In some embodiments of this aspect, the at least one first RA indicator indicates a first random access, RA, procedure to use to access the NTN. In some embodiments of this aspect, the method further includes sending at least one second RA indicator that indicates information relating to a terrestrial network, TN, access; and one or more of: the at least one first RA indicator is different from the at least one second RA indicator, the at least one second RA indicator being to access to the TN and the NTN; the first PRACH format to use to access the NTN is different from a second PRACH format to use to access the TN, the second PRACH format being also to access the NTN; and/or the first RA procedure to use to access the NTN is different from a second RA procedure to use to access the TN, the second RA procedure being also to access the NTN.

In some embodiments of this aspect, the method further includes associating a first WD capability with a second WD capability from a predetermined set of a plurality of capability types. In some embodiments of this aspect, the plurality of capability types comprises one or more of: a first type indicating that the WD does not support a global navigation satellite system, GNSS; a second type indicating that the WD supports the GNSS and is incapable of uplink time and/or frequency pre-compensation before initiating a random access, RA, procedure; and a third type indicating that the WD supports the GNSS and is capable of uplink time and/or frequency pre-compensation before initiating the RA procedure. In some embodiments, associating the first WD capability with the second WD capability comprises associating a capability to support a 2-step RA procedure with a capability to perform a random access, RA, procedure to access the NTN without an uplink time and/or frequency pre-compensation.

In some embodiments, associating the first WD capability with the second WD capability comprises associating a capability to support a shared spectrum channel access with a capability to perform a random access, RA, procedure to access the NTN without an uplink time and/or frequency pre-compensation. In some embodiments of this aspect, the at least one first RA indicator comprises a parameter that identifies a PRACH format to use to access the NTN and an RA procedure to use to access the NTN, the parameter being a part of a predetermined set of a plurality of parameters. In some embodiments of this aspect, the plurality of parameters comprises one or more of: a first parameter that identifies a first PRACH format to use to access the NTN and a first RA procedure to use to access the NTN, the first PRACH format being specific to the NTN access and the first RA procedure being also for a terrestrial network, TN, access; a second parameter that identifies a second PRACH format to use to access the NTN and a second RA procedure to use to access the NTN, the second PRACH format being also for TN access and the second RA procedure being specific to NTN access; and a third PRACH format to use to access the NTN and a third RA procedure to use to access the NTN, the third PRACH format being specific to NTN access and the third RA procedure being specific to NTN access.

In some embodiments of this aspect, one or more of: the first and/or third PRACH formats that are specific to the NTN access are based on two Zadoff-Chu sequences; the second PRACH format that is also for TN access is based on a single Zadoff-Chu sequence; the second and/or third RA procedures that are specific to the NTN access comprise a modification to an RA procedure for TN access; and the first RA procedure that is also for TN access is one of a 4-step and a 2-step RA procedure. In some embodiments of this aspect, the modification comprises an uplink time and/or frequency pre-compensation to be performed before initiation of the RA procedure. In some embodiments of this aspect, at least one of the at least one first RA indicator that indicates information relating to the NTN access is received in one of: a radio resource control, RRC, signaling; a cell specific signaling; and a WD specific signaling. In some embodiments of this aspect, the at least one first RA indicator comprises a first information that is broadcasted in system information, SI, and a second information that indicates a physical random access channel, PRACH, configuration that is specific to the NTN access.

In some embodiments of this aspect, the first information that is broadcasted in the SI indicates whether WDs with a global navigation satellite system, GNSS, capability are allowed to use the PRACH configuration that is specific to the NTN access. In some embodiments of this aspect, the at least one first RA indicator comprises information that indicates whether a serving cell provided by the network node supports a NTN specific random access, RA, type. In some embodiments of this aspect, the at least one first RA indicator comprises information that indicates a common physical random access channel, PRACH, configuration within at least one of a common PRACH configuration information element, IE, and a bandwidth part, BWP, uplink common information element, IE.

In some embodiments of this aspect, the at least one first RA indicator comprises information that indicates a dedicated physical random access channel, PRACH, configuration within at least one of a dedicated PRACH configuration information element, IE, and a bandwidth part, BWP, uplink common information element, IE. In some embodiments of this aspect, allowing the WD to perform the RA that is based at least in part on the at least one first RA indicator comprises allowing the WD to initiate access to the NTN according to an RA type, the RA type to initiate access to the NTN being one of an NTN-specific RA type and a conventional TN RA type, the one of the NTN-specific RA type and the conventional TN RA type being based at least in part on whether the RA is a contention-free or contention-based.

In some embodiments of this aspect, when the RA is contention-free, allowing the WD to initiate access to the NTN based at least in part on a global navigation satellite system, GNSS, capability of the WD. In some embodiments of this aspect, when the RA is contention-based, allowing the WD to initiate the access to the NTN based at least in part on an assumption that different physical random access channel, PRACH, resources are used for the NTN-specific RA type and the conventional TN RA type. In some embodiments of this aspect, allowing the WD to perform the RA that is based at least in part on the at least one first RA indicator comprises: receiving an RA preamble and sending an RA response according to at least one of the at least one first RA indicator to allow the WD to access the NTN.

According to an aspect of the present disclosure, a wireless device, WD, comprising processing circuitry is provided. The processing circuitry is configured to cause the WD to implement any one or more of the methods above.

According to an aspect of the present disclosure, a network node comprising processing circuitry is provided. The processing circuitry is configured to cause the network node to implement any one or more of the methods above.

According to an aspect of the present disclosure, a computer readable medium comprising computer instructions executable by at least one processor to implement any one or more of the methods above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

New PRACH Format for NTN

To design a suitable PRACH format for both UL timing estimation and UL frequency estimation, it is useful to first understand why the existing NR PRACH formats based on Zadoff-Chu (ZC) sequences cannot meet the target. It is known that there are several peaks in the ambiguity function of ZC sequences in the Delay-Doppler plane, leading to many timing and Doppler ambiguities. Due to the nature of ZC sequences, both delay and frequency shift cause cyclic shift in the observation window of received ZC sequences at the gNB. As a result, two issues may arise.

It is difficult if not impossible to separate the two effects (delay and frequency shifts) by observing the composite cyclic shift. Separating them in order to estimate delay and/or frequency shift is needed. This issue exists, even if cyclic shifted ZC sequences with the same root are not used.

If cyclic shifted ZC sequences are used, the composite shift may make sequence A become sequence B, leading to misdetection. This issue has resulted in the introduction of restricted sets in PRACH formats.

Figure 1:
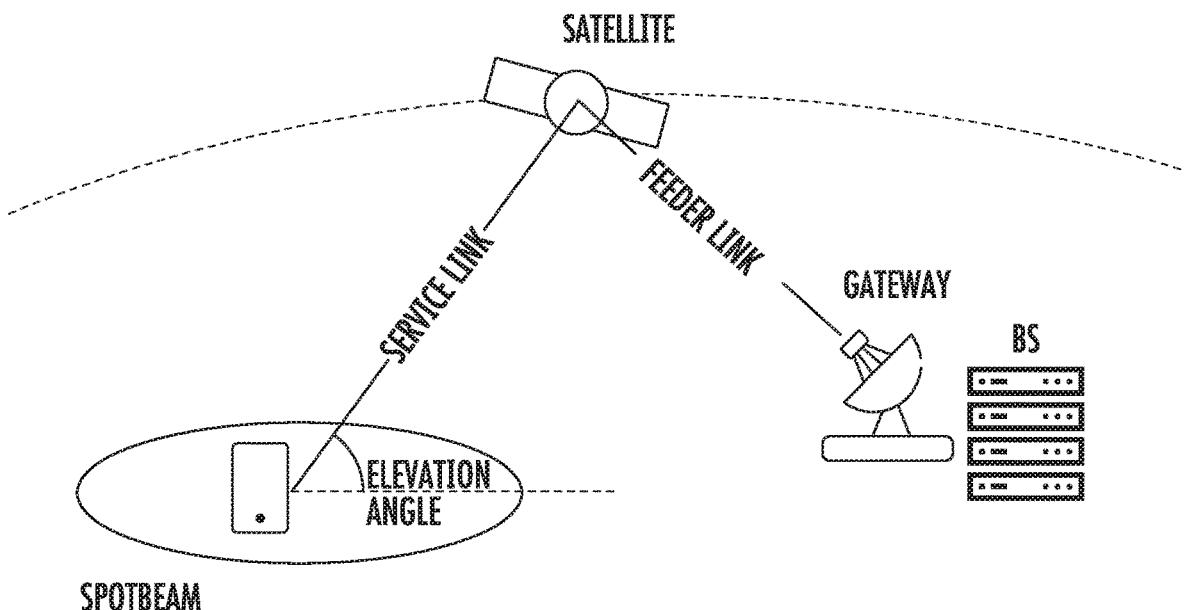
FIG. 1 illustrates an example architecture of a satellite network with bent pipe transponders.
Figure 2:
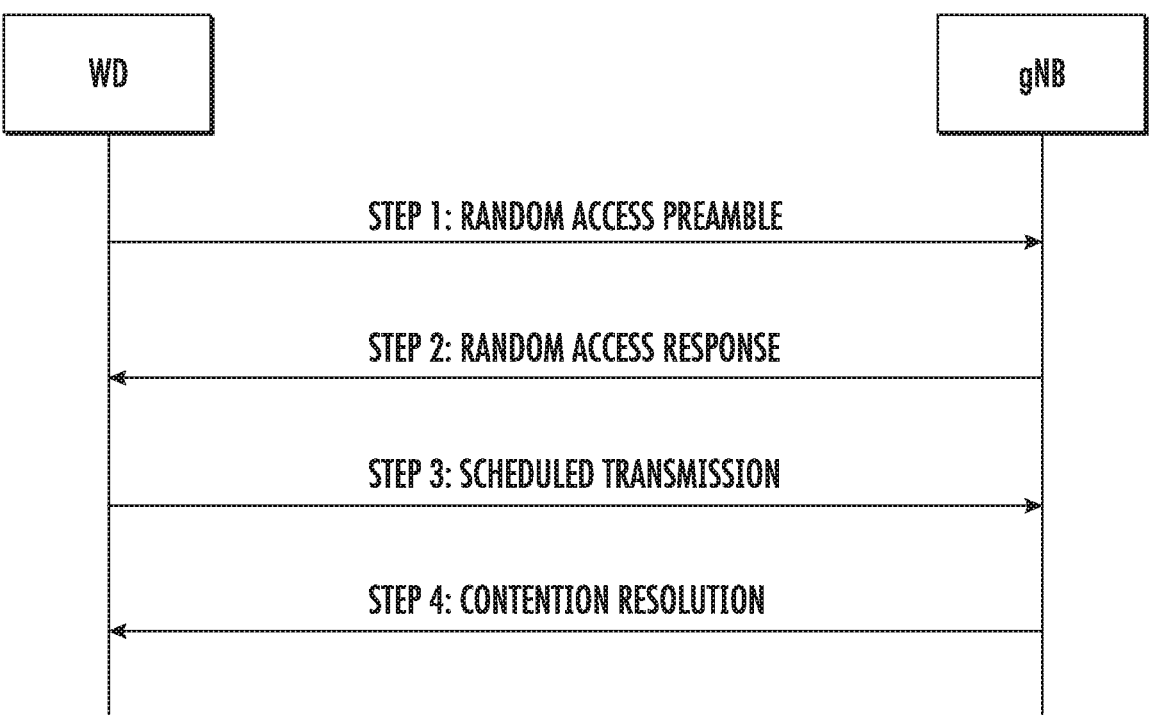
FIG. 2 illustrates an example of four-step random access procedure for initial access.
Figure 3:
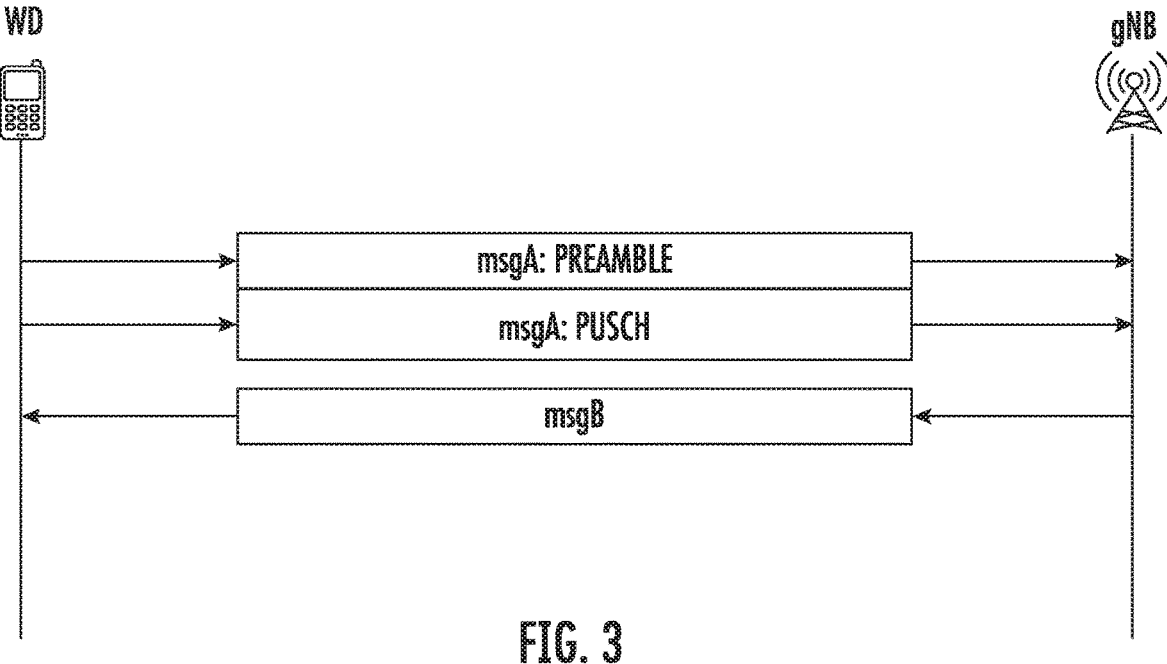
FIG. 3 illustrates an example of two-step random access procedure for initial access.
Figure 4:
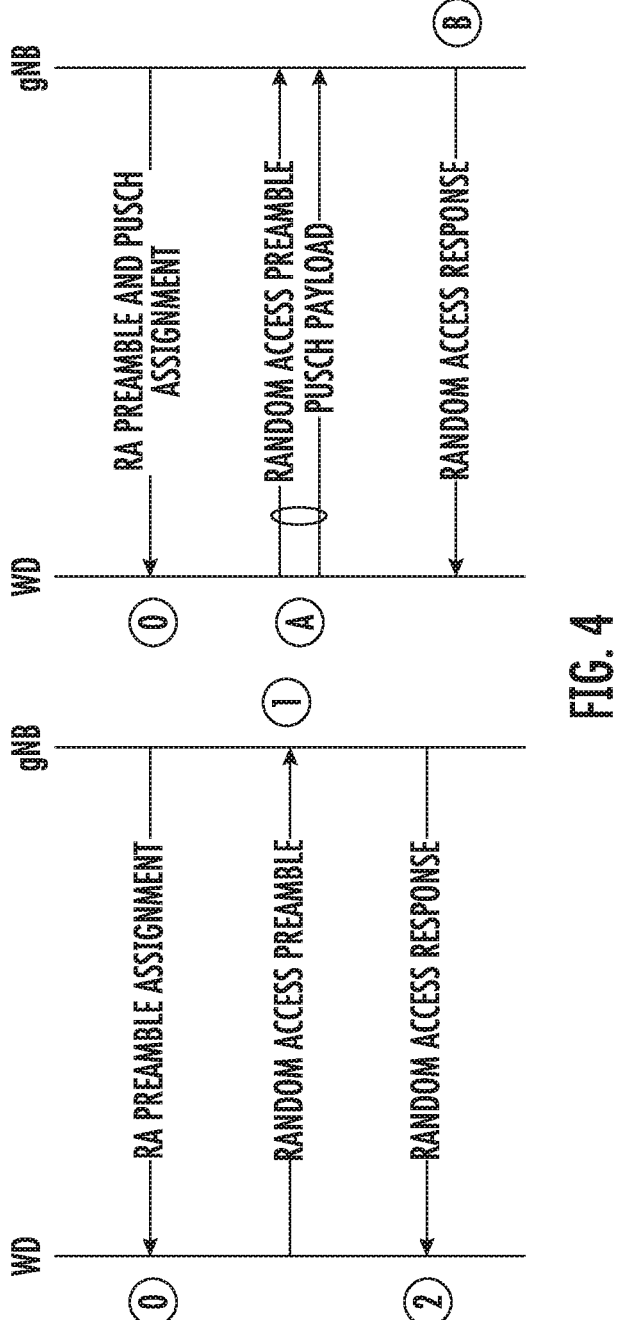
FIG. 4 illustrates an example of CFRA with 4-step RA type (left) and 2-step RA type (right)
Figure 5:
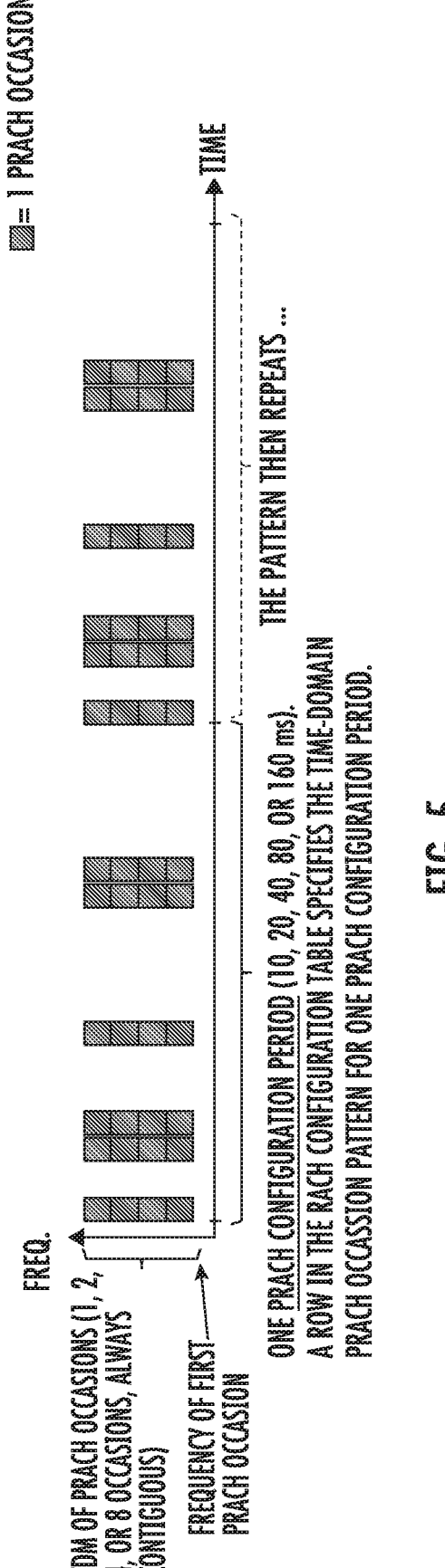
FIG. 5 illustrates an example of the PRACH occasion configuration in NR.
Figure 6:
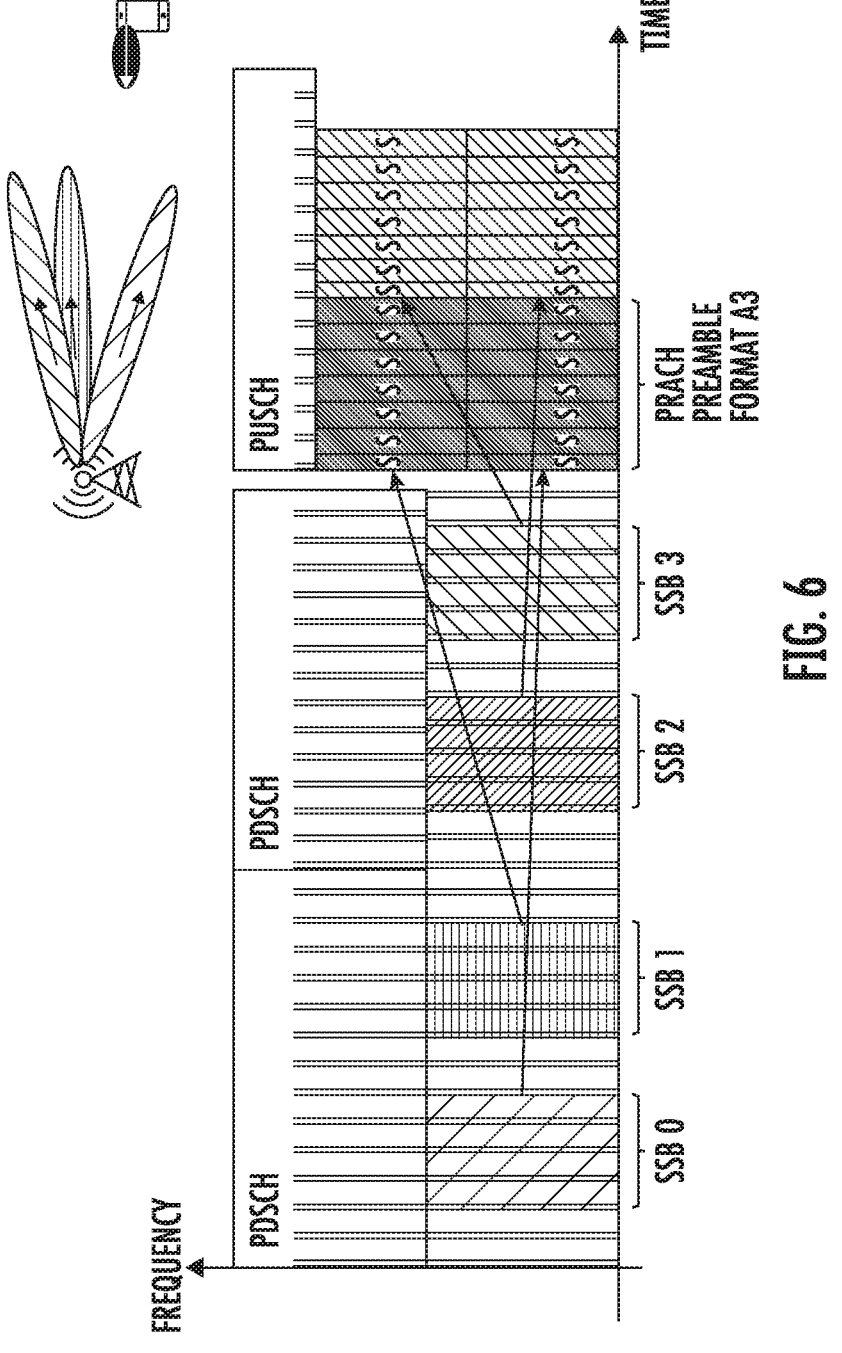
FIG. 6 illustrates an example of one SSB per PRACH occasion.
Figure 7:
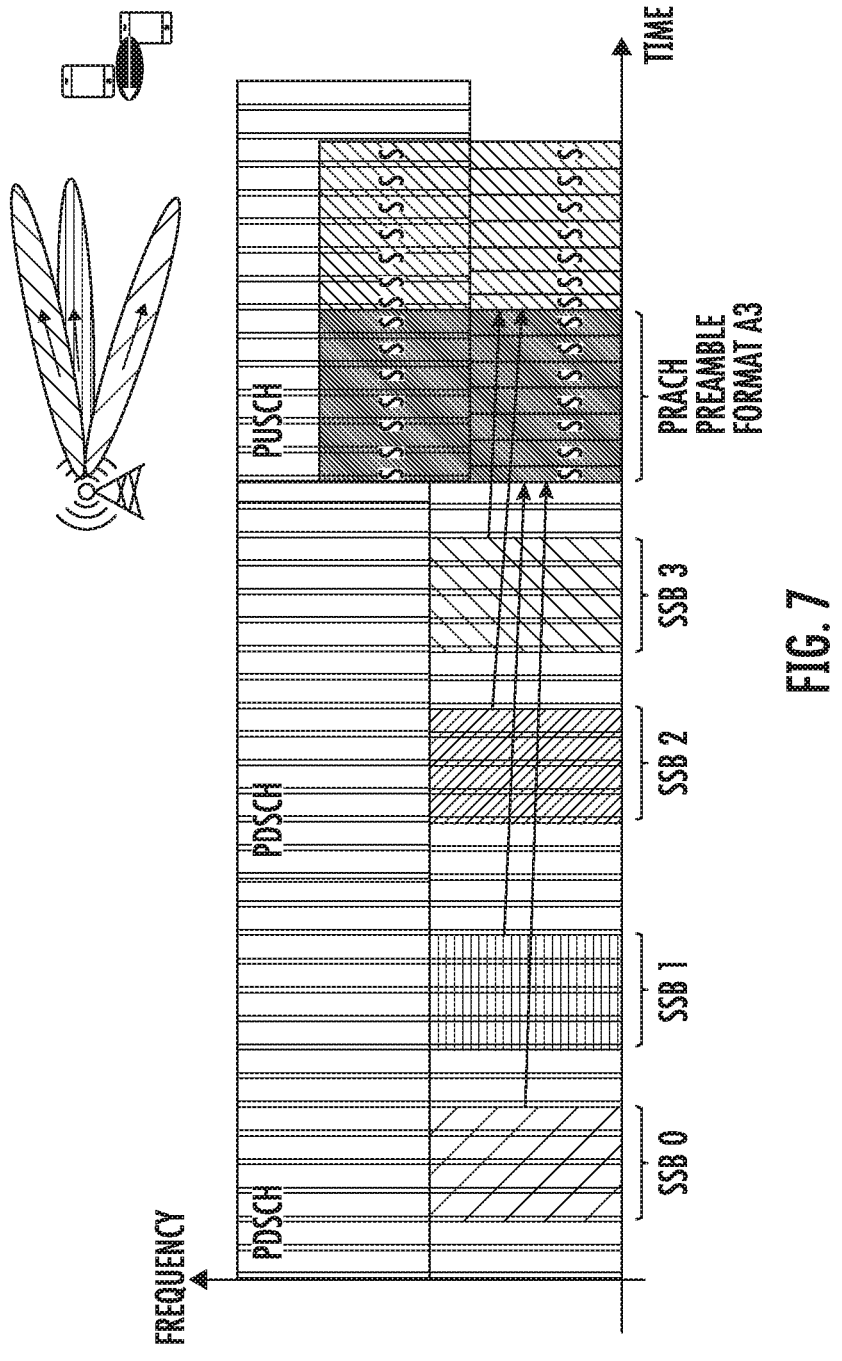
FIG. 7 illustrates an example with 2 SSBs per PRACH occasion.
Figure 8:
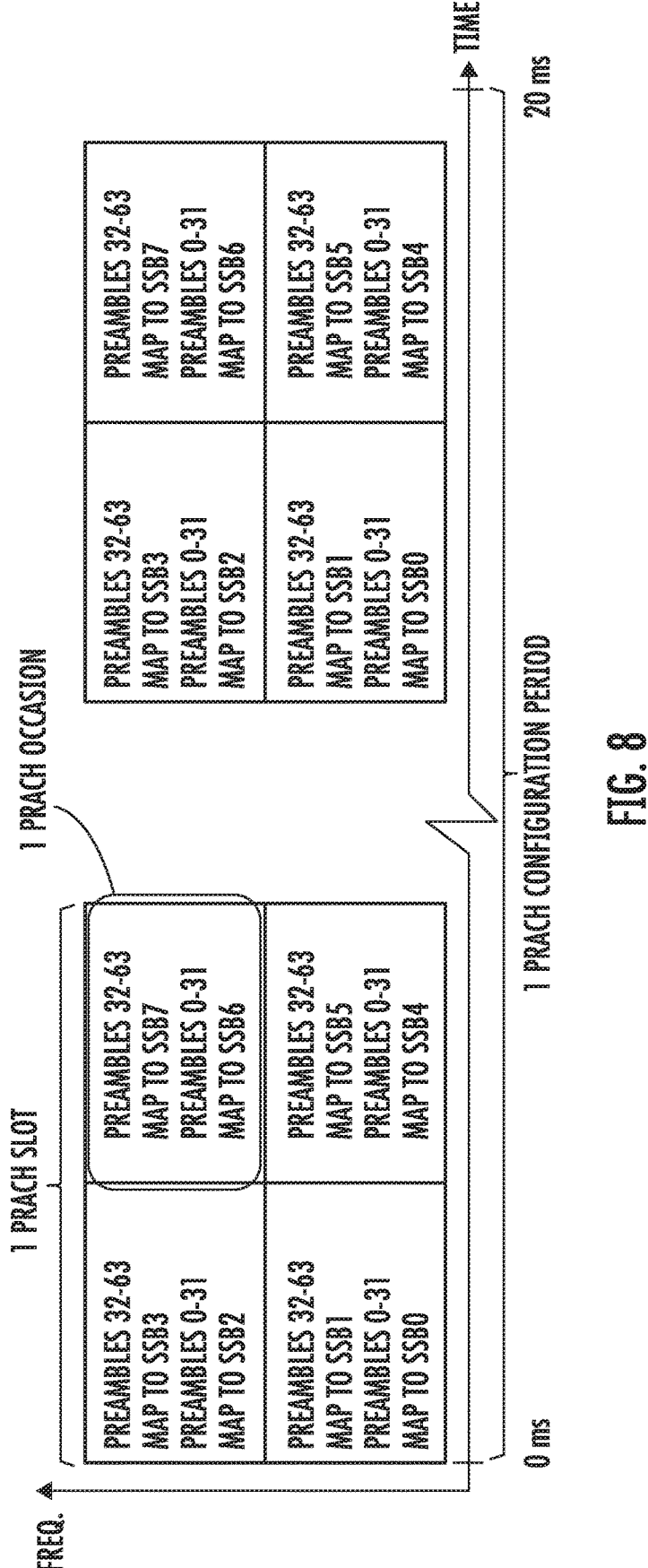
FIG. 8 illustrates an example of the mapping between SSB and random-access preambles.
Figure 9:
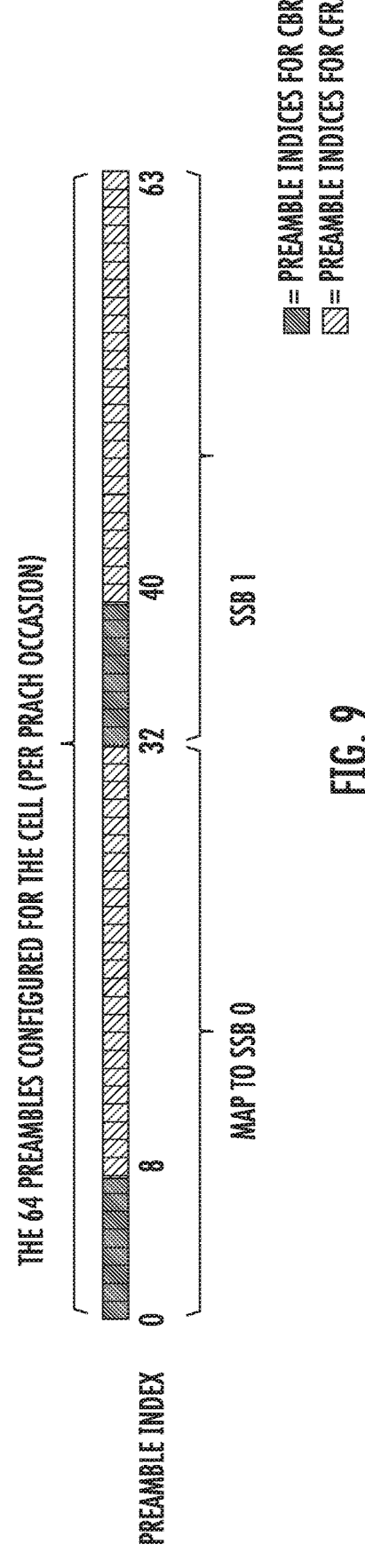
FIG. 9 illustrates an example of the associated preambles for CBRA and CFRA per SSB per PRACH occasion.
Figure 10:
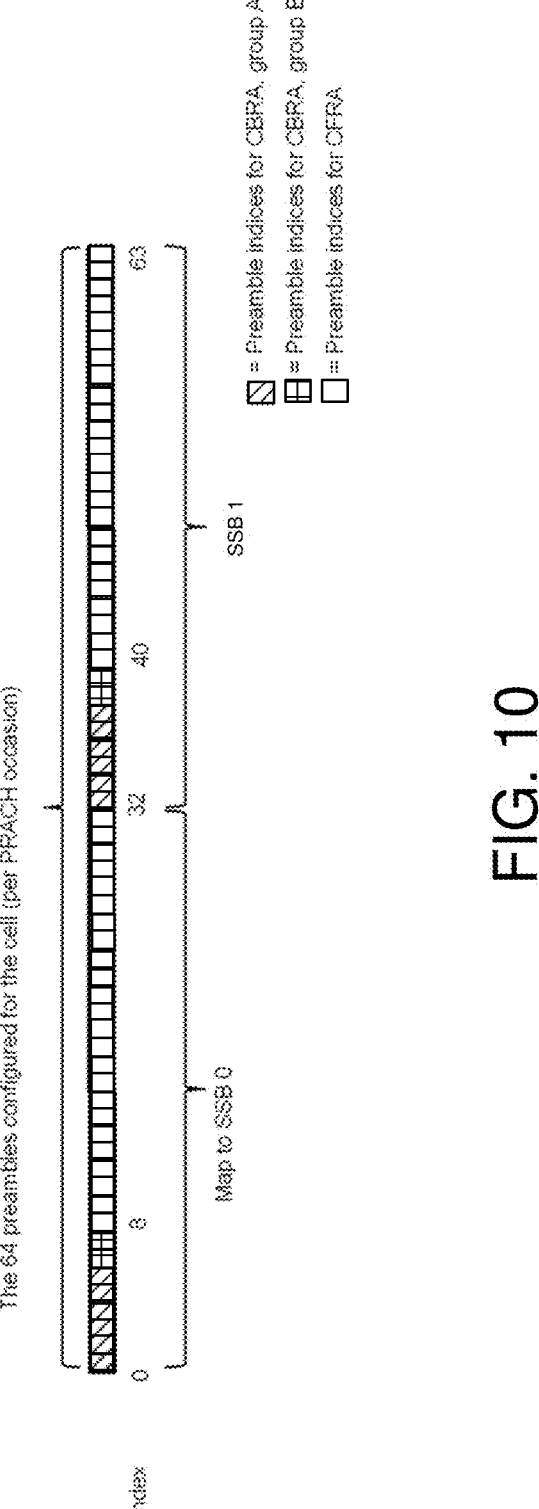
FIG. 10 illustrates an example of the associated preambles for CBRA and CFRA per SSB per PRACH occasion, when Random Access Preambles group B is configured.
Figure 11:
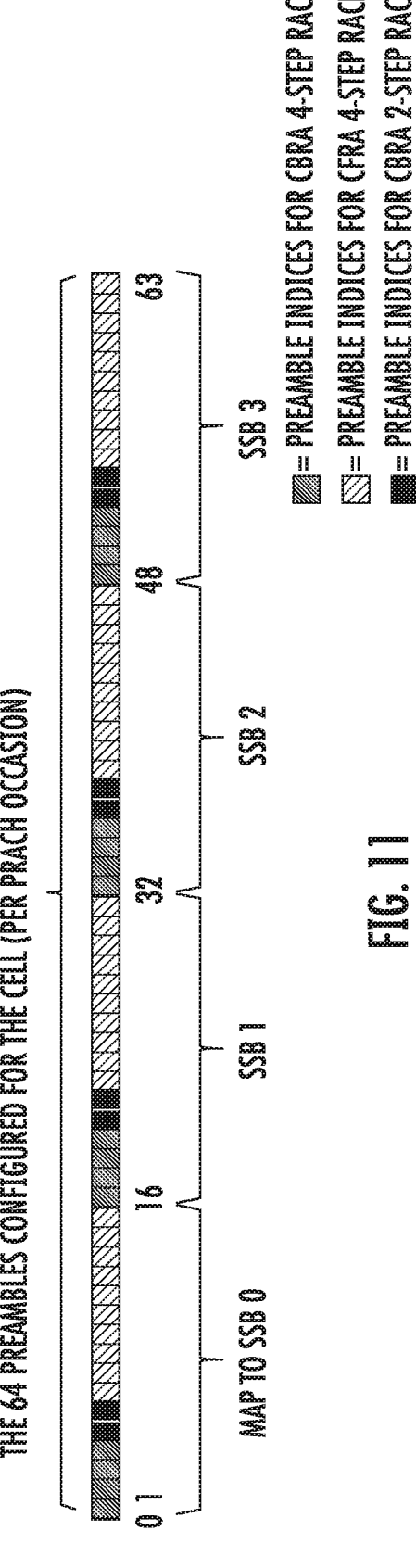
FIG. 11 illustrates an example of the associated preambles for CBRA and CFRA per SSB per PRACH occasion, when ROs for 2-step RACH and 4-step RACH are shared.
Figure 12A:
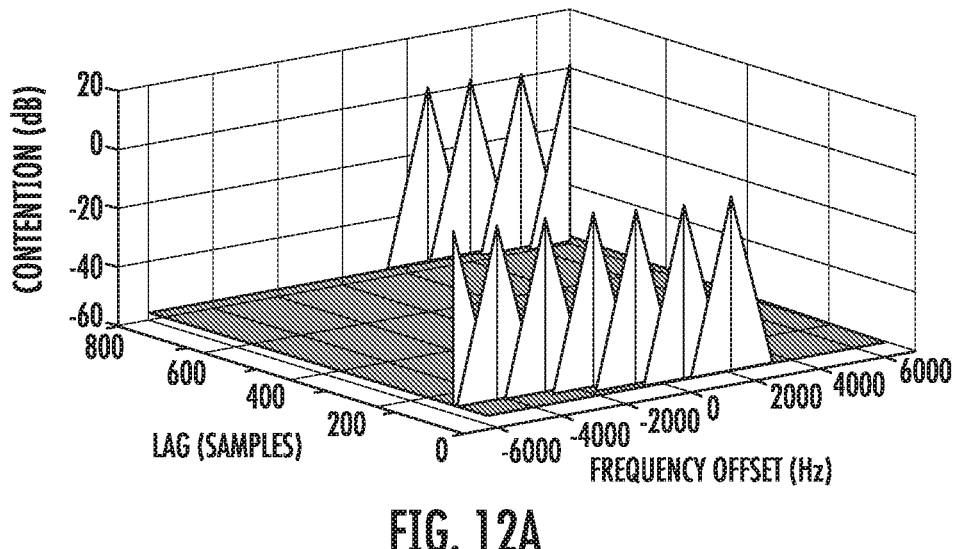
FIG. 12 illustrates an example of Time-frequency uncertainty: (a) ZC with root 56; (b) ZC with root 714.
Figure 12B:
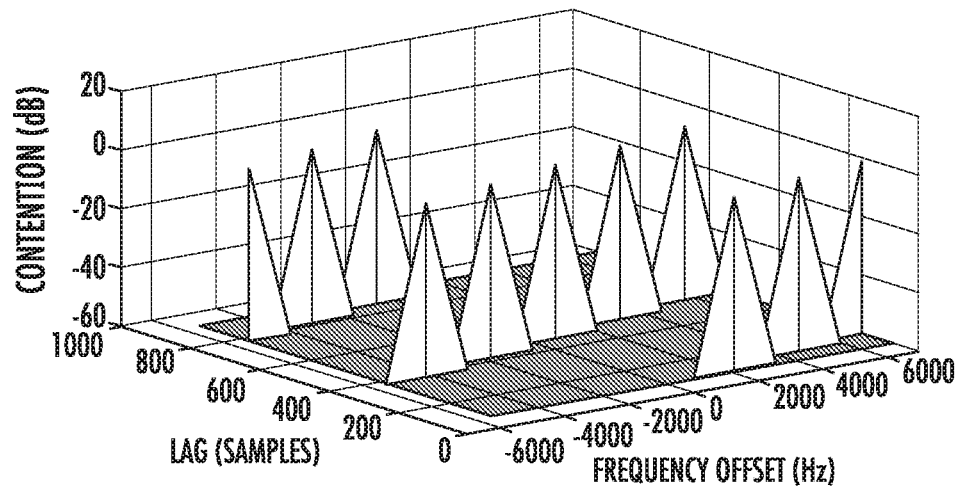

A concrete example is given, illustrating the timing and Doppler ambiguities in PRACH. Assume zero delay and 1.25 kHz frequency offset between transmitter and receiver. The receiver aims to estimate delay and frequency offset by cross correlating the received signal with its reference copy of the transmitted signal. The correlation is performed at multiple hypotheses of frequency offsets that are on the step size of 1.25 kHz. The sampling rate is 30.72 MHz. The cross-correlation results are plotted in FIG. 12, parts (a) and (b) for ZC sequences with roots 56 and 714, respectively. The correlation values in each plot are normalized by the maximum correlation value, yielding a maximum value of 0 dB in each plot. It is clear that in either part (a) or part (b) multiple correlation peaks of the same height are observed. This implies that it is impossible to separate the effects of delay and frequency offset in PRACH in the presence of both large timing and frequency uncertainties, leading to difficulties in timing estimate at the gNB and misdetection of random access preambles.

The timing and frequency offset ambiguities of ZC sequences may be understood by examining their theoretical properties. To this end, the following notation is introduced:

$N_{ZC}$: the length of a ZC sequence u: the root of a ZC sequence, and $0 < u < N_{ZC}$ p: the inverse modulo $N_{ZC}$ of u, i.e., $(p*u)$ mod $N_{ZC}=1$, and $0 < p < N_{ZC}$ $f_{SC}$: the subcarrier spacing of an OFDM signal $\Delta_f$: the frequency offset between transmitted and received signals $n_0$: the delay of received signals relative to the transmitted signal Consider the following form of ZC sequences:

$$x_u[n] = \exp\left(-\frac{j\pi un(n+1)}{N_{ZC}}\right), n = 0, 1, \ldots, N_{ZC} - 1.$$

If $N_{ZC}$ is prime, each u is associated with a unique inverse modulo $N_{ZC}$. It can be shown that if $k=\Delta f/f_{SC}$ (and for simplicity k is assumed to be an integer), the peak of cross correlation of the transmitted and received signals is located at the position of $(n_0+kp)$ mod $N_{ZC}$. Both delay and frequency shift cause cyclic shift in the received ZC sequences, resulting in a composite cyclic shift from which the effect of delay cannot be separated from the effect of frequency shift.

The above analysis also sheds light on how to design a PRACH format to resolve the timing and frequency offset ambiguities. Intuitively, two equations can be used to solve for two unknowns (delay and frequency offset). In particular, if a transmitter sends two signals based on two ZC sequences (that have different properties), the receiver can resolve the timing and frequency offset ambiguities by processing the two received signals.

For example, for two (2) ZC sequences with roots u and −u respectively, the peak of cross correlation of the transmitted and received signals locate at two positions:

Position 1: $s_1 = (n_0 + kp) \bmod N_{ZC}$.
Position 2: $s_2 = (n_0 - kp) \bmod N_{ZC}$.

Figure 13:
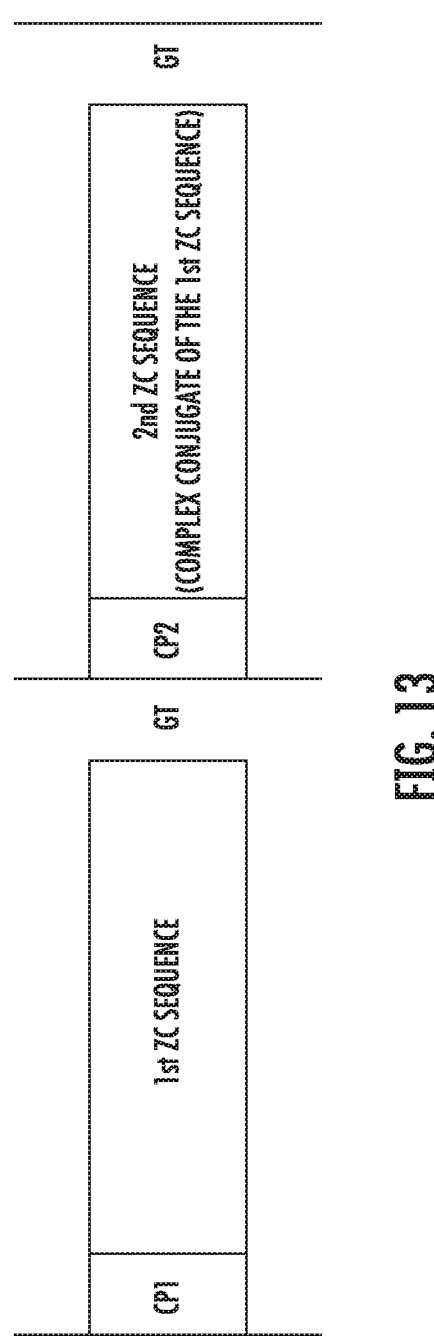
FIG. 13 illustrates an example of PRACH format with 2 ZC sequences, where the second ZC sequence is the complex conjugate of the first ZC sequence.

In this case, the second ZC sequence can be treated as the complex conjugate of the first ZC sequence, as shown in FIG. 13. With two equations, the delay $n_0$ can be estimated as, e.g., $$n_0 = \frac{(s_1 + s_2) \bmod N_{ZC}}{2}.$$

Once the delay is estimated, the frequency offset can then be readily estimated. Note that for simplicity it may be assume that the frequency offset is an integer multiple of the subcarrier spacing. For more general case, it can be shown that the squared autocorrelation of ZC sequence is given by, $$|\gamma(n_0, \Delta f)|^2 = \left| \operatorname{sinc}\left(\frac{\Delta f}{f_{SC}} - u n_0\right) \right|^2.$$

Here the sinc function is defined as $$\operatorname{sinc}(x) = \frac{1}{N} \frac{\sin(\pi x)}{\sin(\pi x / N)}.$$

Then by processing the two received ZC sequences with roots u and −u respectively, the delay $n_0$ and the frequency offset $\Delta_f$ may be estimated accordingly.

Note that the PRACH format illustrated in FIG. 13 has a minimal specification impact. The transmission of the first ZC sequence follows an existing NR PRACH format, and the change may be merely to request one additional transmission of a second ZC sequence that is the complex conjugate of the first ZC sequence.

There currently exist certain challenges. Rel-15 NR standard has been designed with terrestrial networks in mind. The existing NR procedures including random access need to be adapted to cater to the large delay and Doppler shift in an NTN. For example, none of the existing NR PRACH preamble formats can cope with the large differential Doppler shifts in NTN if the device is not able to pre-compensate the large frequency error for the preamble transmission. To address this, a separate PRACH design may be useful for NTN on top of the existing RA design used in a TN network.

Furthermore, depending on the WD capability, different random access mechanisms may be supported to enable differently-abled WDs to coexist in the network. Such coexistence is not possible with existing methods.

Certain aspects of the present disclosure and their embodiments may provide solutions to these or other challenges.

The present disclosure discloses methods, actions and arrangements related to WD capabilities, definitions thereof, and associations among different WD capabilities, e.g., how they can be used, to support random access and associated procedures in NR NTN.

Some embodiments may also address cases where WDs with different capabilities coexist in the network, e.g. by enabling such differently abled WDs to perform random access.

There are, proposed herein, various embodiments which address one or more of the issues disclosed herein.

Certain embodiments may provide one or more of the following technical advantages. Enabling or allowing integration of NTN-specific random access procedures into existing NR standard while reducing, or even minimizing, required changes to the existing NR standard.

Some of the embodiments contemplated herein will now be described more fully with reference to accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 14:
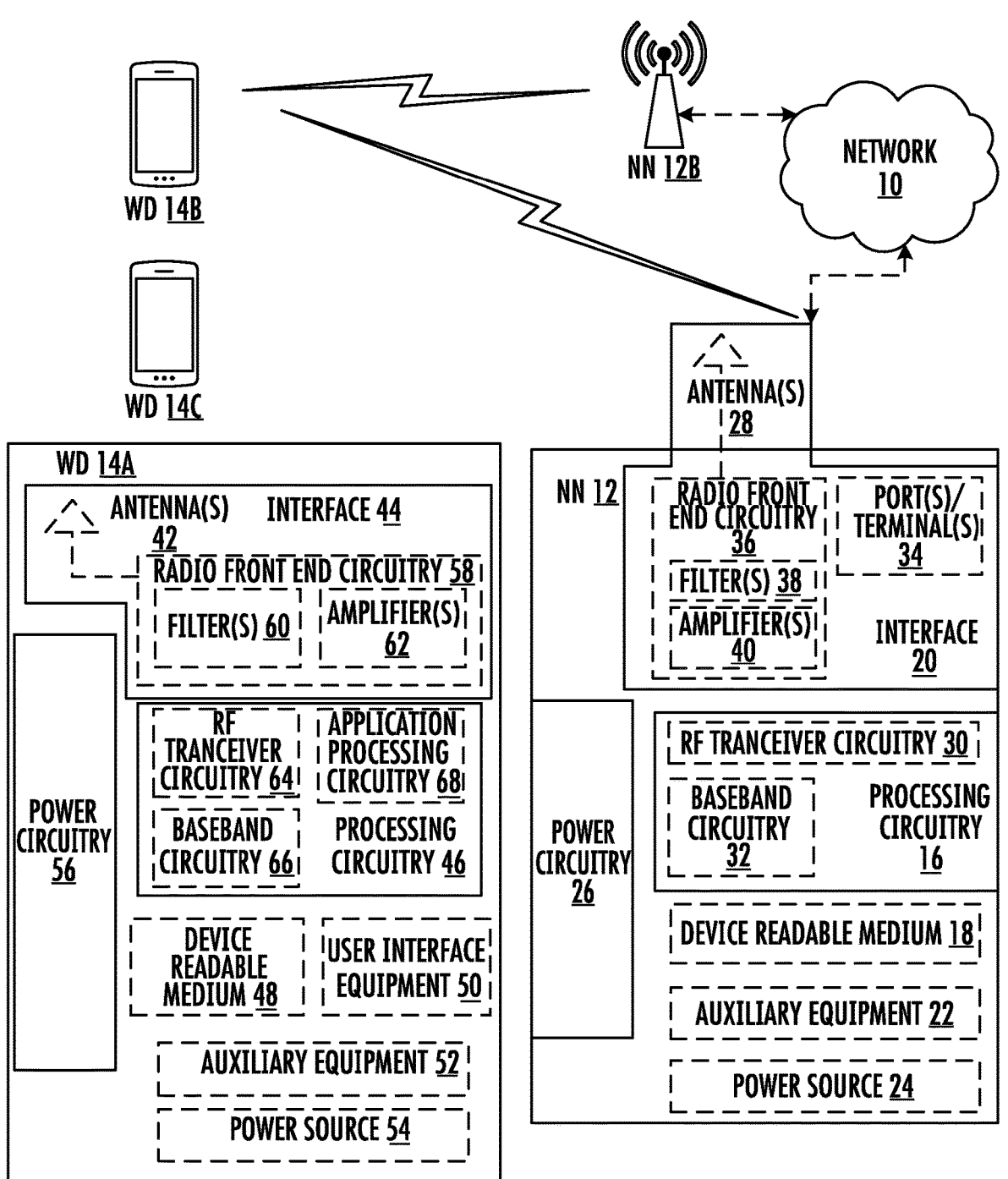
FIG. 14 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 10, network nodes (NNs) 12 and 12b, and WDs 14, 14b, and 14c. In practice, a wireless network may further include any additional elements suitable to support communication between wireless devices or between a wireless device and another communication device, such as a landline telephone, a service provider, or any other network node (NN) or end device. Of the illustrated components, network node 12 and wireless device (WD) 14 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 10 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 12 and WD 14 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 12 includes processing circuitry 16, device readable medium 18, interface 20, auxiliary equipment 22, power source 24, power circuitry 26, and antenna 28. Although network node 12 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 12 are depicted as single boxes located within a larger box, or nested within multiple boxes, in practice, a network node may comprise multiple different physical components that make up a single illustrated component (e.g., device readable medium 18 may comprise multiple separate hard drives as well as multiple RAM modules).

Similarly, network node 12 may be composed of multiple physically separate components (e.g., a NodeB component and a RNC component, or a BTS component and a BSC component, etc.), which may each have their own respective components. In certain scenarios in which network node 12 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 12 may be configured to support multiple radio access technologies (RATs). In such embodiments, some components may be duplicated (e.g., separate device readable medium 18 for the different RATs) and some components may be reused (e.g., the same antenna 28 may be shared by the RATs). Network node 12 may also include multiple sets of the various illustrated components for different wireless technologies integrated into network node 12, such as, for example, GSM, WCDMA, LTE, NR, WiFi, or Bluetooth wireless technologies. These wireless technologies may be integrated into the same or different chip or set of chips and other components within network node 12.

Processing circuitry 16 is configured to perform any determining, calculating, or similar operations (e.g., certain obtaining operations) described herein as being provided by a network node. These operations performed by processing circuitry 16 may include processing information obtained by processing circuitry 16 by, for example, converting the obtained information into other information, comparing the obtained information or converted information to information stored in the network node, and/or performing one or more operations based on the obtained information or converted information, and as a result of said processing making a determination.

Processing circuitry 16 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 12 components, such as device readable medium 18, network node 12 functionality. For example, processing circuitry 16 may execute instructions stored in device readable medium 18 or in memory within processing circuitry 16. Such functionality may include providing any of the various wireless features, functions, or benefits discussed herein. In some embodiments, processing circuitry 16 may include a system on a chip (SOC).

In some embodiments, processing circuitry 16 may include one or more of radio frequency (RF) transceiver circuitry 30 and baseband processing circuitry 32. In some embodiments, radio frequency (RF) transceiver circuitry 30 and baseband processing circuitry 32 may be on separate chips (or sets of chips), boards, or units, such as radio units and digital units. In alternative embodiments, part or all of RF transceiver circuitry 30 and baseband processing circuitry 32 may be on the same chip or set of chips, boards, or units In certain embodiments, some or all of the functionality described herein as being provided by a network node, base station, eNB or other such network device may be performed by processing circuitry 16 executing instructions stored on device readable medium 18 or memory within processing circuitry 16. In alternative embodiments, some or all of the functionality may be provided by processing circuitry 16 without executing instructions stored on a separate or discrete device readable medium, such as in a hard-wired manner. In any of those embodiments, whether executing instructions stored on a device readable storage medium or not, processing circuitry 16 can be configured to perform the described functionality. The benefits provided by such functionality are not limited to processing circuitry 16 alone or to other components of network node 12, but are enjoyed by network node 12 as a whole, and/or by end users and the wireless network generally.

Device readable medium 18 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 16. Device readable medium 18 may store any suitable instructions, data or information, including a computer program, software, an application including one or more of logic, rules, code, tables, etc. and/or other instructions capable of being executed by processing circuitry 16 and, utilized by network node 12. Device readable medium 18 may be used to store any calculations made by processing circuitry 16 and/or any data received via interface 20. In some embodiments, processing circuitry 16 and device readable medium 18 may be considered to be integrated.

Interface 20 is used in the wired or wireless communication of signalling and/or data between network node 12, network 10, and/or WDs 14. As illustrated, interface 20 comprises port(s)/terminal(s) 34 to send and receive data, for example to and from network 10 over a wired connection. Interface 20 also includes radio front end circuitry 36 that may be coupled to, or in certain embodiments a part of, antenna 28. Radio front end circuitry 36 comprises filters 38 and amplifiers 40. Radio front end circuitry 36 may be connected to antenna 28 and processing circuitry 16. Radio front end circuitry may be configured to condition signals communicated between antenna 28 and processing circuitry 16. Radio front end circuitry 36 may receive digital data that is to be sent out to other network nodes or WDs via a wireless connection. Radio front end circuitry 36 may convert the digital data into a radio signal having the appropriate channel and bandwidth parameters using a combination of filters 38 and/or amplifiers 40. The radio signal may then be transmitted via antenna 28. Similarly, when receiving data, antenna 28 may collect radio signals which are then converted into digital data by radio front end circuitry 36. The digital data may be passed to processing circuitry 16. In other embodiments, the interface may comprise different components and/or different combinations of components.

In certain alternative embodiments, network node 12 may not include separate radio front end circuitry 36, instead, processing circuitry 16 may comprise radio front end circuitry and may be connected to antenna 28 without separate radio front end circuitry 36. Similarly, in some embodiments, all or some of RF transceiver circuitry 30 may be considered a part of interface 20. In still other embodiments, interface 20 may include one or more ports or terminals 34, radio front end circuitry 36, and RF transceiver circuitry 30, as part of a radio unit (not shown), and interface 20 may communicate with baseband processing circuitry 32, which is part of a digital unit (not shown).

Antenna 28 may include one or more antennas, or antenna arrays, configured to send and/or receive wireless signals. Antenna 28 may be coupled to radio front end circuitry 36 and may be any type of antenna capable of transmitting and receiving data and/or signals wirelessly. In some embodiments, antenna 28 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 28 may be separate from network node 12 and may be connectable to network node 12 through an interface or port.

Antenna 28, interface 20, and/or processing circuitry 16 may be configured to perform any receiving operations and/or certain obtaining operations described herein as being performed by a network node. Any information, data and/or signals may be received from a wireless device, another network node and/or any other network equipment. Similarly, antenna 28, interface 20, and/or processing circuitry 16 may be configured to perform any transmitting operations described herein as being performed by a network node. Any information, data and/or signals may be transmitted to a wireless device, another network node and/or any other network equipment.

Power circuitry 26 may comprise, or be coupled to, power management circuitry and is configured to supply the components of network node 12 with power for performing the functionality described herein. Power circuitry 26 may receive power from power source 24. Power source 24 and/or power circuitry 26 may be configured to provide power to the various components of network node 12 in a form suitable for the respective components (e.g., at a voltage and current level needed for each respective component). Power source 24 may either be included in, or external to, power circuitry 26 and/or network node 12. For example, network node 12 may be connectable to an external power source (e.g., an electricity outlet) via an input circuitry or interface such as an electrical cable, whereby the external power source supplies power to power circuitry 26. As a further example, power source 24 may comprise a source of power in the form of a battery or battery pack which is connected to, or integrated in, power circuitry 26. The battery may provide backup power should the external power source fail. Other types of power sources, such as photovoltaic devices, may also be used.

Alternative embodiments of network node 12 may include additional components beyond those shown in FIG. 14 that may be responsible for providing certain aspects of the network node's functionality, including any of the functionality described herein and/or any functionality necessary to support the subject matter described herein. For example, network node 12 may include user interface equipment to allow input of information into network node 12 and to allow output of information from network node 12. This may allow a user to perform diagnostic, maintenance, repair, and other administrative functions for network node 12.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a WD implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 14 includes antenna 42, interface 44, processing circuitry 46, device readable medium 48, user interface equipment 50, auxiliary equipment 52, power source 54 and power circuitry 56. WD 14 may include multiple sets of one or more of the illustrated components for different wireless technologies supported by WD 14, such as, for example, GSM, WCDMA, LTE, NR, WiFi, WiMAX, or Bluetooth wireless technologies, just to mention a few. These wireless technologies may be integrated into the same or different chips or set of chips as other components within WD 14.

Antenna 42 may include one or more antennas or antenna arrays, configured to send and/or receive wireless signals, and is connected to interface 44. In certain alternative embodiments, antenna 42 may be separate from WD 14 and be connectable to WD 14 through an interface or port. Antenna 42, interface 44, and/or processing circuitry 46 may be configured to perform any receiving or transmitting operations described herein as being performed by a WD. Any information, data and/or signals may be received from a network node and/or another WD. In some embodiments, radio front end circuitry and/or antenna 42 may be considered an interface.

As illustrated, interface 44 comprises radio front end circuitry 58 and antenna 42. Radio front end circuitry 58 comprise one or more filters 60 and amplifiers 62. Radio front end circuitry 58 is connected to antenna 42 and processing circuitry 46, and is configured to condition signals communicated between antenna 42 and processing circuitry 46. Radio front end circuitry 58 may be coupled to or a part of antenna 42. In some embodiments, WD 14 may not include separate radio front end circuitry 58; rather, processing circuitry 46 may comprise radio front end circuitry and may be connected to antenna 42. Similarly, in some embodiments, some or all of RF transceiver circuitry 64 may be considered a part of interface 44. Radio front end circuitry 58 may receive digital data that is to be sent out to other network nodes or WDs via a wireless connection. Radio front end circuitry 58 may convert the digital data into a radio signal having the appropriate channel and bandwidth parameters using a combination of filters 60 and/or amplifiers 62. The radio signal may then be transmitted via antenna 42. Similarly, when receiving data, antenna 42 may collect radio signals which are then converted into digital data by radio front end circuitry 58. The digital data may be passed to processing circuitry 46. In other embodiments, the interface may comprise different components and/or different combinations of components.

Processing circuitry 46 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 14 components, such as device readable medium 48, WD 14 functionality. Such functionality may include providing any of the various wireless features or benefits discussed herein. For example, processing circuitry 46 may execute instructions stored in device readable medium 48 or in memory within processing circuitry 46 to provide the functionality disclosed herein.

As illustrated, processing circuitry 46 includes one or more of RF transceiver circuitry 64, baseband processing circuitry 66, and application processing circuitry 68. In other embodiments, the processing circuitry may comprise different components and/or different combinations of components. In certain embodiments processing circuitry 46 of WD 14 may comprise a SOC. In some embodiments, RF transceiver circuitry 64, baseband processing circuitry 66, and application processing circuitry 68 may be on separate chips or sets of chips. In alternative embodiments, part or all of baseband processing circuitry 66 and application processing circuitry 68 may be combined into one chip or set of chips, and RF transceiver circuitry 64 may be on a separate chip or set of chips. In still alternative embodiments, part or all of RF transceiver circuitry 64 and baseband processing circuitry 66 may be on the same chip or set of chips, and application processing circuitry 68 may be on a separate chip or set of chips. In yet other alternative embodiments, part or all of RF transceiver circuitry 64, baseband processing circuitry 66, and application processing circuitry 68 may be combined in the same chip or set of chips. In some embodiments, RF transceiver circuitry 64 may be a part of interface 44. RF transceiver circuitry 64 may condition RF signals for processing circuitry 46.

In certain embodiments, some or all of the functionality described herein as being performed by a WD may be provided by processing circuitry 46 executing instructions stored on device readable medium 48, which in certain embodiments may be a computer-readable storage medium. In alternative embodiments, some or all of the functionality may be provided by processing circuitry 46 without executing instructions stored on a separate or discrete device readable storage medium, such as in a hard-wired manner. In any of those particular embodiments, whether executing instructions stored on a device readable storage medium or not, processing circuitry 46 can be configured to perform the described functionality. The benefits provided by such functionality are not limited to processing circuitry 46 alone or to other components of WD 14, but are enjoyed by WD 14 as a whole, and/or by end users and the wireless network generally.

Processing circuitry 46 may be configured to perform any determining, calculating, or similar operations (e.g., certain obtaining operations) described herein as being performed by a WD. These operations, as performed by processing circuitry 46, may include processing information obtained by processing circuitry 46 by, for example, converting the obtained information into other information, comparing the obtained information or converted information to information stored by WD 14, and/or performing one or more operations based on the obtained information or converted information, and as a result of said processing making a determination.

Device readable medium 48 may be operable to store a computer program, software, an application including one or more of logic, rules, code, tables, etc. and/or other instructions capable of being executed by processing circuitry 46. Device readable medium 48 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 46. In some embodiments, processing circuitry 46 and device readable medium 48 may be considered to be integrated.

User interface equipment 50 may provide components that allow for a human user to interact with WD 14. Such interaction may be of many forms, such as visual, audial, tactile, etc. User interface equipment 50 may be operable to produce output to the user and to allow the user to provide input to WD 14. The type of interaction may vary depending on the type of user interface equipment 50 installed in WD 14. For example, if WD 14 is a smart phone, the interaction may be via a touch screen; if WD 14 is a smart meter, the interaction may be through a screen that provides usage (e.g., the number of gallons used) or a speaker that provides an audible alert (e.g., if smoke is detected). User interface equipment 50 may include input interfaces, devices and circuits, and output interfaces, devices and circuits. User interface equipment 50 is configured to allow input of information into WD 14, and is connected to processing circuitry 46 to allow processing circuitry 46 to process the input information. User interface equipment 50 may include, for example, a microphone, a proximity or other sensor, keys/buttons, a touch display, one or more cameras, a USB port, or other input circuitry. User interface equipment 50 is also configured to allow output of information from WD 14, and to allow processing to circuitry 46 to output information from WD 14. User interface equipment 50 may include, for example, a speaker, a display, vibrating circuitry, a USB port, a headphone interface, or other output circuitry. Using one or more input and output interfaces, devices, and circuits, of user interface equipment 50, WD 14 may communicate with end users and/or the wireless network, and allow them to benefit from the functionality described herein.

Auxiliary equipment 52 is operable to provide more specific functionality which may not be generally performed by WDs. This may comprise specialized sensors for doing measurements for various purposes, interfaces for additional types of communication such as wired communications etc. The inclusion and type of components of auxiliary equipment 52 may vary depending on the embodiment and/or scenario.

Power source 54 may, in some embodiments, be in the form of a battery or battery pack. Other types of power sources, such as an external power source (e.g., an electricity outlet), photovoltaic devices or power cells, may also be used. WD 14 may further comprise power circuitry 56 for delivering power from power source 54 to the various parts of WD 14 which need power from power source 54 to carry out any functionality described or indicated herein. Power circuitry 56 may in certain embodiments comprise power management circuitry. Power circuitry 56 may additionally or alternatively be operable to receive power from an external power source; in which case WD 14 may be connectable to the external power source (such as an electricity outlet) via input circuitry or an interface such as an electrical power cable. Power circuitry 56 may also in certain embodiments be operable to deliver power from an external power source to power source 54. This may be, for example, for the charging of power source 54. Power circuitry 56 may perform any formatting, converting, or other modification to the power from power source 54 to make the power suitable for the respective components of WD 14 to which power is supplied.

Figure 15:
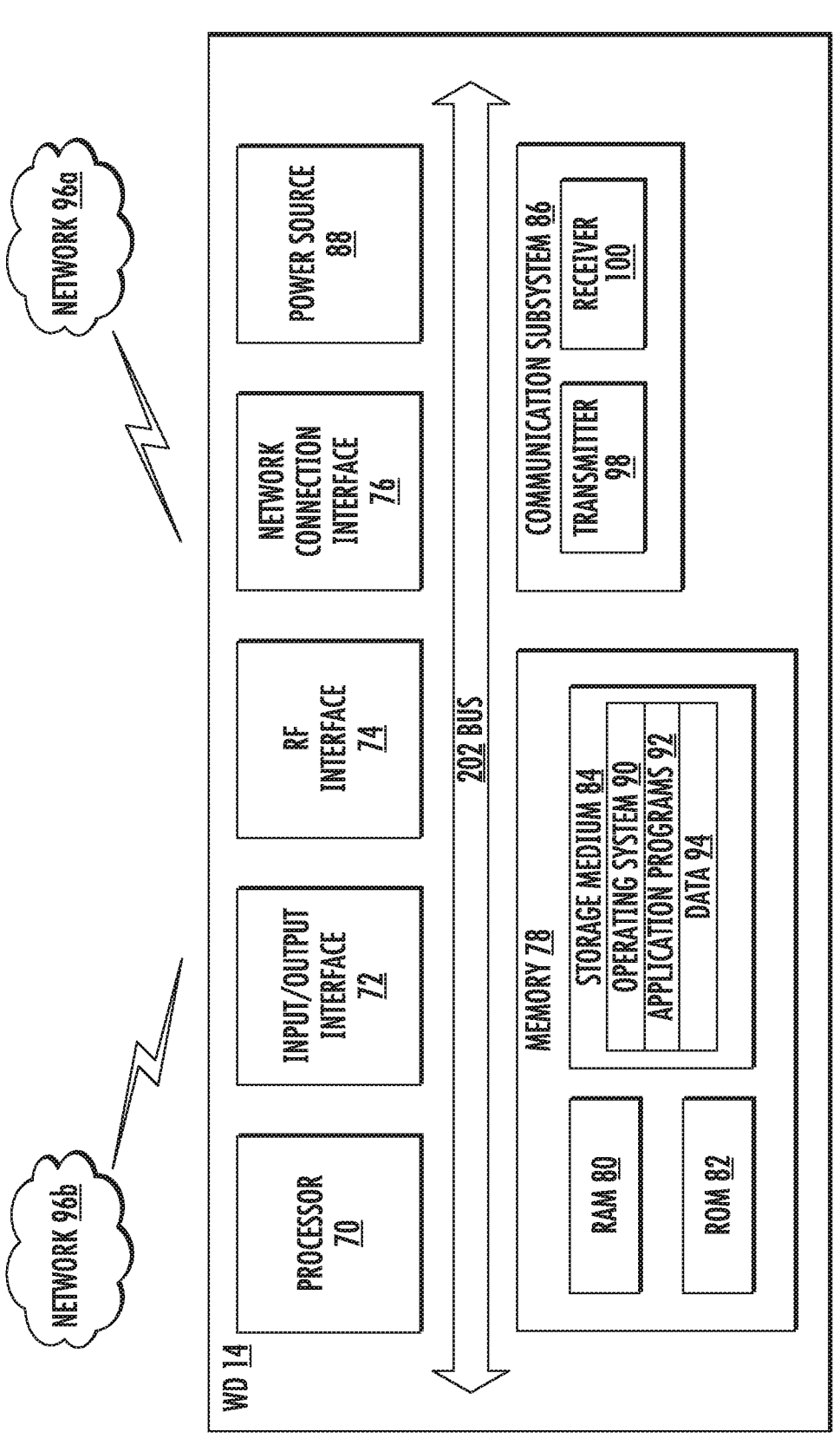
FIG. 15 illustrates a wireless device in accordance with some embodiments.

FIG. 15 illustrates one embodiment of a WD 14 in accordance with various aspects described herein. As used herein, a user equipment or WD 14 may not necessarily have a user in the sense of a human user who owns and/or operates the relevant device. Instead, a WD 14 may represent a device that is intended for sale to, or operation by, a human user but which may not, or which may not initially, be associated with a specific human user (e.g., a smart sprinkler controller). Alternatively, a WD 14 may represent a device that is not intended for sale to, or operation by, an end user but which may be associated with or operated for the benefit of a user (e.g., a smart power meter). WD 14 may be any WD identified by the 3$^{rd}$ Generation Partnership Project (3GPP), including a NB-IoT WD, a machine type communication (MTC) WD, and/or an enhanced MTC (eMTC) WD. WD 14, as illustrated in FIG. 15, is one example of a WD 14 configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a WD 14, the components discussed herein are equally applicable to a UE, and vice-versa.

In FIG. 15, WD 14 includes processing circuitry 70 that is operatively coupled to input/output interface 72, radio frequency (RF) interface 74, network connection interface 76, memory 78 including random access memory (RAM) 80, read-only memory (ROM) 82, and storage medium 84 or the like, communication subsystem 86, power source 88, and/or any other component, or any combination thereof. Storage medium 84 includes operating system 90, application program 92, and data 94. In other embodiments, storage medium 84 may include other similar types of information.

Certain WDs may utilize all of the components shown in FIG. 15, or only a subset of the components. The level of integration between the components may vary from one WD to another WD. Further, certain WDs may contain multiple instances of a component, such as multiple processors, memories, transceivers, transmitters, receivers, etc.

In FIG. 15, processing circuitry 70 may be configured to process computer instructions and data. Processing circuitry 70 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 70 may include two central processing units (CPUs). Data may be information in a form suitable for use by a computer.

In the depicted embodiment, input/output interface 72 may be configured to provide a communication interface to an input device, output device, or input and output device. WD 14 may be configured to use an output device via input/output interface 72. An output device may use the same type of interface port as an input device. For example, a USB port may be used to provide input to and output from WD 14. The output device may be a speaker, a sound card, a video card, a display, a monitor, a printer, an actuator, an emitter, a smartcard, another output device, or any combination thereof. WD 14 may be configured to use an input device via input/output interface 72 to allow a user to capture information into WD 14. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 74 may be configured to provide a communication interface to RF components such as a transmitter, a receiver, and an antenna. Network connection interface 76 may be configured to provide a communication interface to network 96a. Network 96a may encompass wired and/or wireless networks such as a local-area network (LAN), a wide-area network (WAN), a computer network, a wireless network, a telecommunications network, another like network or any combination thereof. For example, network 96a may comprise a Wi-Fi network. Network connection interface 76 may be configured to include a receiver and a transmitter interface used to communicate with one or more other devices over a communication network according to one or more communication protocols, such as Ethernet, TCP/IP, SONET, ATM, or the like. Network connection interface 76 may implement receiver and transmitter functionality appropriate to the communication network links (e.g., optical, electrical, and the like). The transmitter and receiver functions may share circuit components, software or firmware, or alternatively may be implemented separately.

RAM 80 may be configured to interface via bus 202 to processing circuitry 70 to provide storage or caching of data or computer instructions during the execution of software programs such as the operating system, application programs, and device drivers. ROM 82 may be configured to provide computer instructions or data to processing circuitry 70. For example, ROM 82 may be configured to store invariant low-level system code or data for basic system functions such as basic input and output (I/O), startup, or reception of keystrokes from a keyboard that are stored in a non-volatile memory. Storage medium 84 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 84 may be configured to include operating system 90, application program 92 such as a web browser application, a widget or gadget engine or another application, and data file 94. Storage medium 84 may store, for use by WD 14, any of a variety of various operating systems or combinations of operating systems.

Storage medium 84 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 84 may allow WD 14 to access computer-executable instructions, application programs or the like, stored on transitory or non-transitory memory media, to off-load data, or to upload data. An article of manufacture, such as one utilizing a communication system may be tangibly embodied in storage medium 84, which may comprise a device readable medium.

In FIG. 15, processing circuitry 70 may be configured to communicate with network 96b using communication subsystem 86. Network 96a and network 96b may be the same network or networks or different network or networks. Communication subsystem 86 may be configured to include one or more transceivers used to communicate with network 96b. For example, communication subsystem 86 may be configured to include one or more transceivers used to communicate with one or more remote transceivers of another device capable of wireless communication such as another WD/UE, or base station of a radio access network (RAN) according to one or more communication protocols, such as IEEE 802.11, CDMA, WCDMA, GSM, LTE, UTRAN, WiMax, or the like. Each transceiver may include transmitter 98 and/or receiver 100 to implement transmitter or receiver functionality, respectively, appropriate to the RAN links (e.g., frequency allocations and the like). Further, transmitter 98 and receiver 100 of each transceiver may share circuit components, software or firmware, or alternatively may be implemented separately.

In the illustrated embodiment, the communication functions of communication subsystem 86 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 86 may include cellular communication, Wi-Fi communication, Bluetooth communication, and GPS communication. Network 96*b* may encompass wired and/or wireless networks such as a local-area network (LAN), a wide-area network (WAN), a computer network, a wireless network, a telecommunications network, another like network or any combination thereof. For example, network 96*b* may be a cellular network, a Wi-Fi network, and/or a near-field network. Power source QQ213 may be configured to provide alternating current (AC) or direct current (DC) power to components of WD 14.

The features, benefits and/or functions described herein may be implemented in one of the components of WD 14 or partitioned across multiple components of WD 14. Further, the features, benefits, and/or functions described herein may be implemented in any combination of hardware, software or firmware. In one example, communication subsystem 86 may be configured to include any of the components described herein. Further, processing circuitry 70 may be configured to communicate with any of such components over bus 202. In another example, any of such components may be represented by program instructions stored in memory that when executed by processing circuitry 70 perform the corresponding functions described herein. In another example, the functionality of any of such components may be partitioned between processing circuitry 70 and communication subsystem 86. In another example, the non-computationally intensive functions of any of such components may be implemented in software or firmware and the computationally intensive functions may be implemented in hardware.

Figure 16:
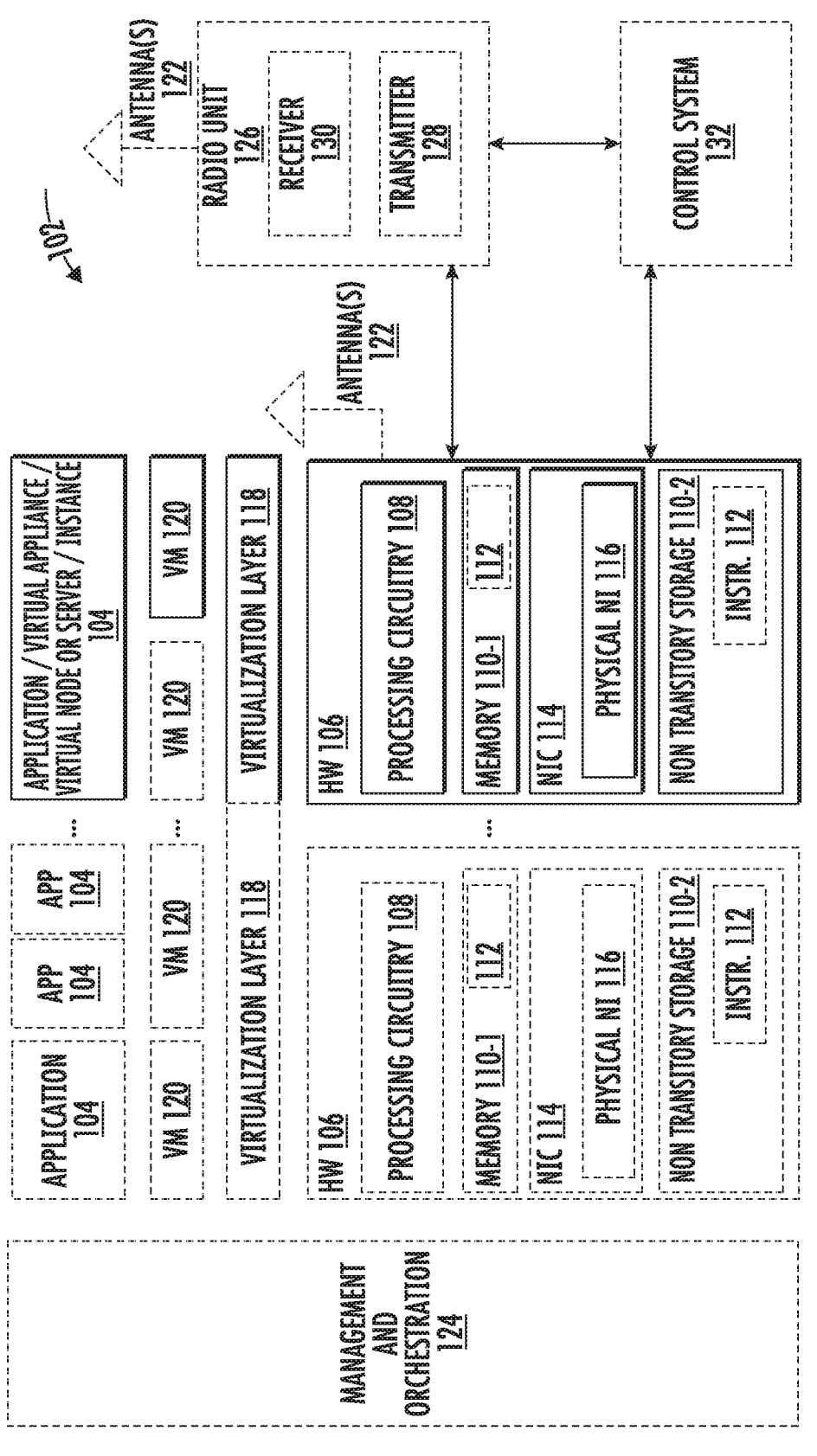
FIG. 16 illustrates a virtualization environment in accordance with some embodiments.

FIG. 16 is a schematic block diagram illustrating a virtualization environment 102 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a WD, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 102 hosted by one or more of hardware nodes 106. Further, in embodiments in which the virtual node is not a radio access node or does not require radio connectivity (e.g., a core network node), then the network node may be entirely virtualized.

The functions may be implemented by one or more applications 104 (which may alternatively be called software instances, virtual appliances, network functions, virtual nodes, virtual network functions, etc.) operative to implement some of the features, functions, and/or benefits of some of the embodiments disclosed herein. Applications 104 are run in virtualization environment 102 which provides hardware 106 comprising processing circuitry 108 and memory 110. Memory 110 contains instructions 112 executable by processing circuitry 108 whereby application 104 is operative to provide one or more of the features, benefits, and/or functions disclosed herein.

Virtualization environment 102, comprises general-purpose or special-purpose network hardware devices 106 comprising a set of one or more processors or processing circuitry 108, which may be commercial off-the-shelf (COTS) processors, dedicated Application Specific Integrated Circuits (ASICs), or any other type of processing circuitry including digital or analog hardware components or special purpose processors. Each hardware device may comprise memory 110-1 which may be non-persistent memory for temporarily storing instructions 112 or software executed by processing circuitry 108. Each hardware device may comprise one or more network interface controllers (NICs) 114, also known as network interface cards, which include physical network interface 116. Each hardware device may also include non-transitory, persistent, machine-readable storage media 110-2 having stored therein software 112 and/or instructions executable by processing circuitry 108. Software 112 may include any type of software including software for instantiating one or more virtualization layers 118 (also referred to as hypervisors), software to execute virtual machines 120 as well as software allowing it to execute functions, features and/or benefits described in relation with some embodiments described herein.

Virtual machines 120, comprise virtual processing, virtual memory, virtual networking or interface and virtual storage, and may be run by a corresponding virtualization layer 118 or hypervisor. Different embodiments of the instance of virtual applicant 104 may be implemented on one or more of virtual machines 120, and the implementations may be made in different ways.

During operation, processing circuitry 108 executes software 112 to instantiate the hypervisor or virtualization layer 118, which may sometimes be referred to as a virtual machine monitor (VMM). Virtualization layer 118 may present a virtual operating platform that appears like networking hardware to virtual machine 120.

As shown in FIG. 16, hardware 106 may be a standalone network node with generic or specific components. Hardware 106 may comprise antenna 122 and may implement some functions via virtualization. Alternatively, hardware 106 may be part of a larger cluster of hardware (e.g., such as in a data center or customer premise equipment (CPE)) where many hardware nodes work together and are managed via management and orchestration (MANO) 124, which, among others, oversees lifecycle management of applications 104.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 120 may be a software implementation of a physical machine that runs programs as if they were executing on a physical, non-virtualized machine. Each of virtual machines 120, and that part of hardware 106 that executes that virtual machine, be it hardware dedicated to that virtual machine and/or hardware shared by that virtual machine with others of the virtual machines 120, forms a separate virtual network elements (VNE).

Still in the context of NFV, Virtual Network Function (VNF) is responsible for handling specific network functions that run in one or more virtual machines 120 on top of hardware networking infrastructure 106 and corresponds to application 104 in FIG. 16.

In some embodiments, one or more radio units 126 that each include one or more transmitters 128 and one or more receivers 130 may be coupled to one or more antennas 122. Radio units 126 may communicate directly with hardware nodes 106 via one or more appropriate network interfaces and may be used in combination with the virtual components to provide a virtual node with radio capabilities, such as a radio access node or a base station.

In some embodiments, some signalling can be effected with the use of control system 132 which may alternatively be used for communication between the hardware nodes 106 and radio units 126.

Figure 17:
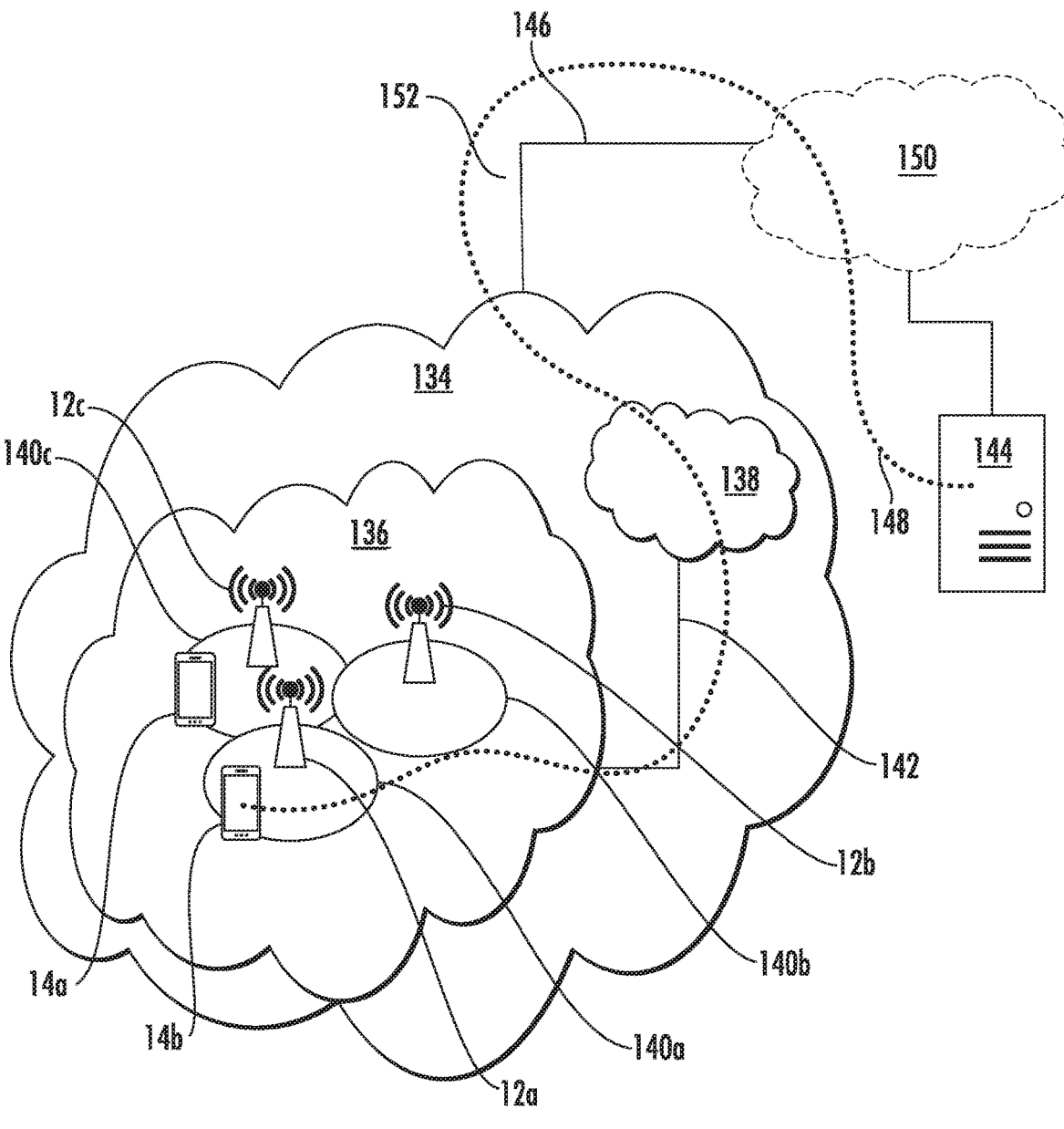
FIG. 17 illustrates a telecommunication network connected via an intermediate network to host a computer in accordance with some embodiments.

With reference to FIG. 17, in accordance with an embodiment, a communication system includes telecommunication network 134, such as a 3GPP-type cellular network, which comprises access network 136, such as a radio access network, and core network 138. Access network 136 comprises a plurality of network nodes 12a, 12b, 12c, such as NBs, eNBs, gNBs or other types of wireless access points, each defining a corresponding coverage area 140a, 140b, 140c. Each network node 12a, 12b, 12c is connectable to core network 138 over a wired or wireless connection 142. A first WD 14a located in coverage area 140c is configured to wirelessly connect to, or be paged by, the corresponding network node 12c. A second WD 14b in coverage area 140a is wirelessly connectable to the corresponding network node 12a. While a plurality of WDs 14a, 14b are illustrated in this example, the disclosed embodiments are equally applicable to a situation where a sole WD is in the coverage area or where a sole WD is connecting to the corresponding network node 12.

Telecommunication network 134 is itself connected to host computer 144, which may be embodied in the hardware and/or software of a standalone server, a cloud-implemented server, a distributed server or as processing resources in a server farm. Host computer 144 may be under the ownership or control of a service provider, or may be operated by the service provider or on behalf of the service provider. Connections 146 and 148 between telecommunication network 134 and host computer 144 may extend directly from core network 138 to host computer 144 or may go via an optional intermediate network 150. Intermediate network 150 may be one of, or a combination of more than one of, a public, private or hosted network; intermediate network 150, if any, may be a backbone network or the Internet; in particular, intermediate network 150 may comprise two or more subnetworks (not shown).

The communication system of FIG. 17 as a whole enables connectivity between the connected WDs 14a, 14b and host computer 144. The connectivity may be described as an over-the-top (OTT) connection 152. Host computer 144 and the connected WDs 14a, 14b are configured to communicate data and/or signaling via OTT connection 152, using access network 136, core network 138, any intermediate network 150 and possible further infrastructure (not shown) as intermediaries. OTT connection 152 may be transparent in the sense that the participating communication devices through which OTT connection 152 passes are unaware of routing of uplink and downlink communications. For example, network node 12 may not or need not be informed about the past routing of an incoming downlink communication with data originating from host computer 144 to be forwarded (e.g., handed over) to a connected WD 14a. Similarly, network node 12 need not be aware of the future routing of an outgoing uplink communication originating from the WD 14a towards the host computer 144.

Example implementations, in accordance with an embodiment, of the WD, network node and host computer discussed in the preceding paragraphs will now be described with reference to FIG. 18. In communication system 154, host computer 144 comprises hardware 156 including communication interface 158 configured to set up and maintain a wired or wireless connection with an interface of a different communication device of communication system 154. Host computer 144 further comprises processing circuitry 160, which may have storage and/or processing capabilities. In particular, processing circuitry 160 may comprise one or more programmable processors, application-specific integrated circuits, field programmable gate arrays or combinations of these (not shown) adapted to execute instructions. Host computer 144 further comprises software 162, which is stored in or accessible by host computer 144 and executable by processing circuitry 160. Software 162 includes host application 164. Host application 164 may be operable to provide a service to a remote user, such as WD 14 connecting via OTT connection 166 terminating at WD 14 and host computer 144. In providing the service to the remote user, host application 164 may provide user data which is transmitted using OTT connection 166.

Communication system 154 further includes network node 12 provided in a telecommunication system and comprising hardware 168 enabling it to communicate with host computer 144 and with WD 14. Hardware 168 may include communication interface 170 for setting up and maintaining a wired or wireless connection with an interface of a different communication device of communication system 154, as well as radio interface 172 for setting up and maintaining at least wireless connection 174 with WD 14 located in a coverage area (not shown in FIG. 18) served by network node 12. Communication interface 170 may be configured to facilitate connection 176 to host computer 144. Connection 176 may be direct or it may pass through a core network (not shown in FIG. 18) of the telecommunication system and/or through one or more intermediate networks outside the telecommunication system. In the embodiment shown, hardware 168 of network node 12 further includes processing circuitry 178, which may comprise one or more programmable processors, application-specific integrated circuits, field programmable gate arrays or combinations of these (not shown) adapted to execute instructions. Network node 12 further has software 180 stored internally or accessible via an external connection.

Communication system 154 further includes WD 14 already referred to. Its hardware 182 may include radio interface 184 configured to set up and maintain wireless connection 174 with a network node serving a coverage area in which WD 14 is currently located. Hardware 182 of WD 14 further includes processing circuitry 186, which may comprise one or more programmable processors, application-specific integrated circuits, field programmable gate arrays or combinations of these (not shown) adapted to execute instructions. WD 14 further comprises software 188, which is stored in or accessible by WD 14 and executable by processing circuitry 186. Software 188 includes client application 190. Client application 190 may be operable to provide a service to a human or non-human user via WD 14, with the support of host computer 144. In host computer 144, an executing host application 164 may communicate with the executing client application 190 via OTT connection 166 terminating at WD 14 and host computer 144. In providing the service to the user, client application 190 may receive request data from host application 164 and provide user data in response to the request data. OTT connection 166 may transfer both the request data and the user data. Client application 190 may interact with the user to generate the user data that it provides.

Figure 18:
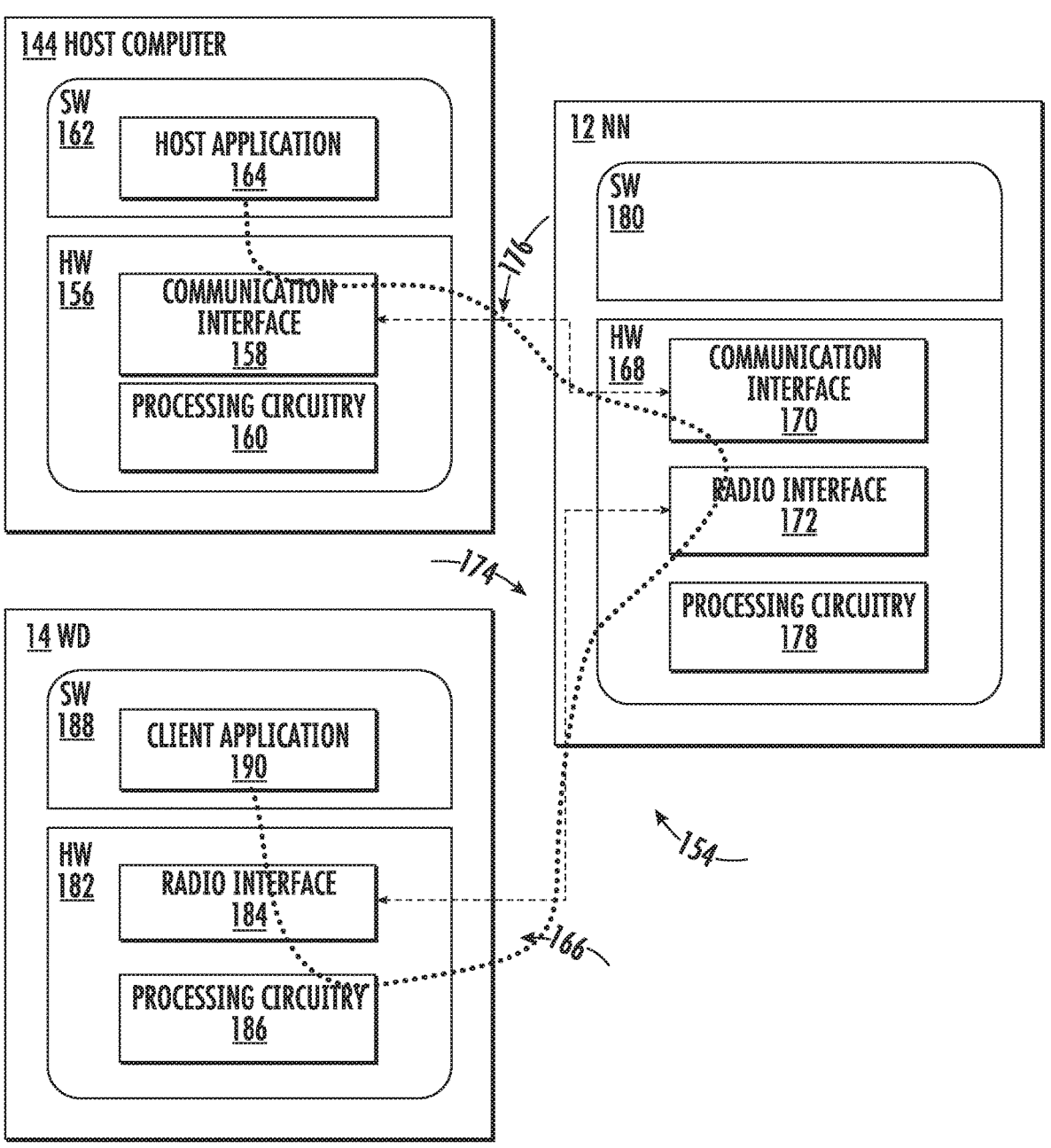
FIG. 18 illustrates a host computer communicating via a base station with a user equipment over a partially wireless connection in accordance with some embodiments.

It is noted that host computer 144, network node 12 and WD 14 illustrated in FIG. 18 may be similar or identical to host computer 144, one of network nodes 12*a*, 12*b*, 12*c* and one of WDs 14, 14*b* of FIG. 17, respectively. This is to say, the inner workings of these entities may be as shown in FIG. 18 and independently, the surrounding network topology may be that of FIG. 17.

In FIG. 18, OTT connection 166 has been drawn abstractly to illustrate the communication between host computer 144 and WD 14 via network node 12, without explicit reference to any intermediary devices and the precise routing of messages via these devices. Network infrastructure may determine the routing, which it may be configured to hide from WD 14 or from the service provider operating host computer 144, or both. While OTT connection 166 is active, the network infrastructure may further take decisions by which it dynamically changes the routing (e.g., on the basis of load balancing consideration or reconfiguration of the network).

Wireless connection 174 between WD 14 and network node 12 is in accordance with the teachings of the embodiments described throughout this disclosure. One or more of the various embodiments improve the performance of OTT services provided to WD 14 using OTT connection 166, in which wireless connection 174 forms the last segment. More precisely, the teachings of these embodiments may improve the latency/activation delay, reducing overhead, improving Network Key Performance Indicators (KPI) and WD Quality of Service (QoS) and thereby provide benefits such as an efficient way of system adaptation by changing a full RRC profile associated with a BWP without RRC signaling.

A measurement procedure may be provided for the purpose of monitoring data rate, latency and other factors on which the one or more embodiments improve. There may further be an optional network functionality for reconfiguring OTT connection 166 between host computer 144 and WD 14, in response to variations in the measurement results. The measurement procedure and/or the network functionality for reconfiguring OTT connection 166 may be implemented in software 162 and hardware 156 of host computer 144 or in software 180 and hardware 182 of WD 14, or both. In embodiments, sensors (not shown) may be deployed in or in association with communication devices through which OTT connection 166 passes; the sensors may participate in the measurement procedure by supplying values of the monitored quantities exemplified above, or supplying values of other physical quantities from which software 180, 188 may compute or estimate the monitored quantities. The reconfiguring of OTT connection 166 may include message format, retransmission settings, preferred routing etc.; the reconfiguring need not affect network node 12, and it may be unknown or imperceptible to network node 12. Such procedures and functionalities may be known and practiced in the art. In certain embodiments, measurements may involve proprietary WD signaling facilitating host computer 144's measurements of throughput, propagation times, latency and the like. The measurements may be implemented in that software 162 and 186 causes messages to be transmitted, in particular empty or 'dummy' messages, using OTT connection 166 while it monitors propagation times, errors etc.

Figures 19, 20:
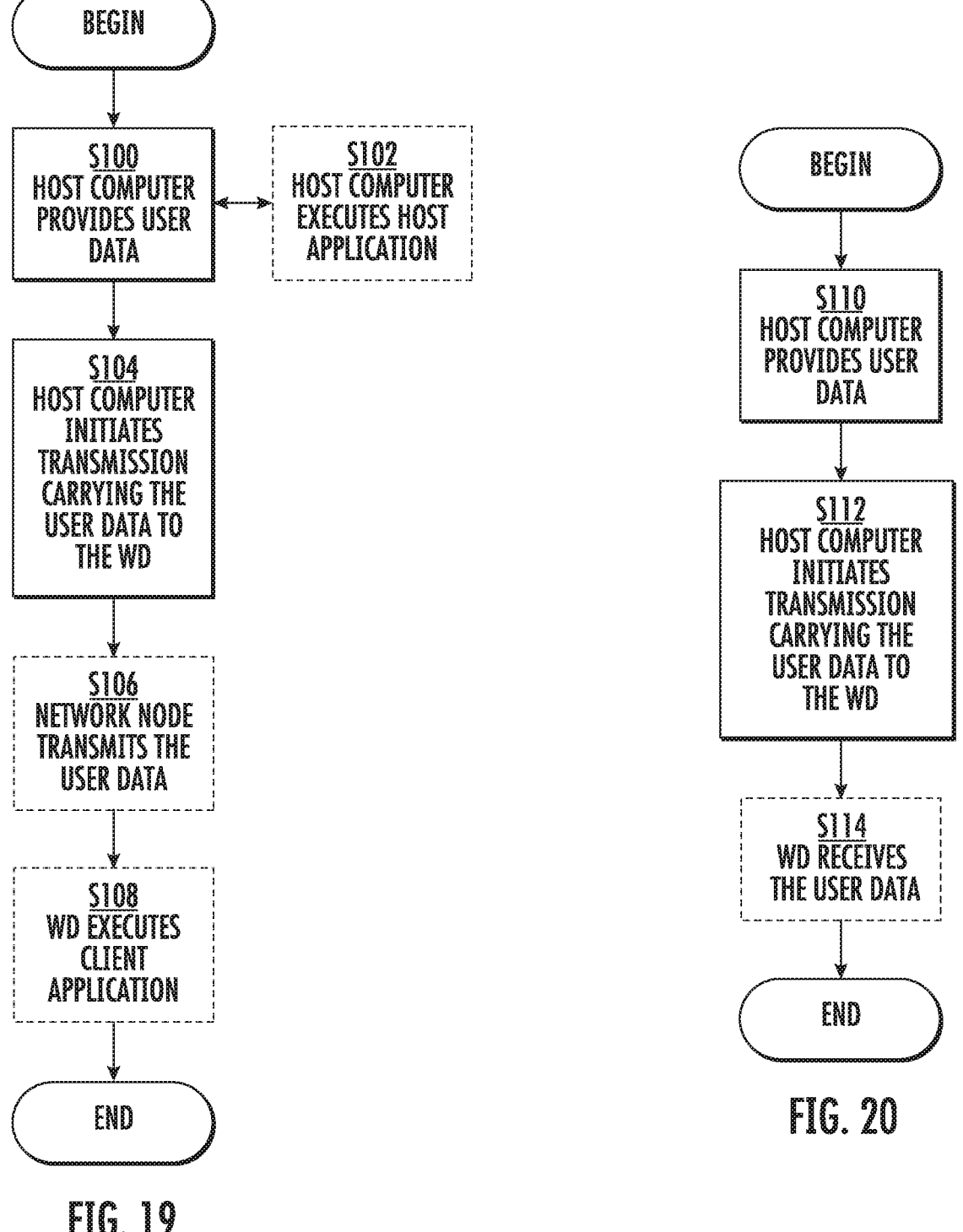
FIG. 19 illustrates example methods implemented in a communication system including a host computer, a base station and a user equipment in accordance with some embodiments.
FIG. 20 illustrates example methods implemented in a communication system including a host computer, a base station and a user equipment in accordance with some embodiments.

FIG. 19 is a flowchart illustrating a method implemented in a communication system, in accordance with one embodiment. The communication system includes a host computer 144, a network node 12 and a WD 14 which may be those described with reference to FIGS. 17 and 18. For simplicity of the present disclosure, only drawing references to FIG. 19 will be included in this section. In S100, the host computer 144 provides user data. In substep S102 (which may be optional) of step S100, the host computer 144 provides the user data by executing a host application 164. In step S104, the host computer 144 initiates a transmission carrying the user data to the WD 14. In step S106 (which may be optional), the network node 12 transmits to the WD 14 the user data which was carried in the transmission that the host computer 144 initiated, in accordance with the teachings of the embodiments described throughout this disclosure. In step S108 (which may also be optional), the WD 14 executes a client application 190 associated with the host application 164 executed by the host computer 144.

FIG. 20 is a flowchart illustrating a method implemented in a communication system, in accordance with one embodiment. The communication system includes a host computer 144, a network node 12 and a WD 14 which may be those described with reference to FIGS. 17 and 18. For simplicity of the present disclosure, only drawing references to FIG. 20 will be included in this section. In step S110 of the method, the host computer 144 provides user data. In an optional substep (not shown) the host computer 144 provides the user data by executing a host application 164. In step S112, the host computer 144 initiates a transmission carrying the user data to the WD 14. The transmission may pass via the network node 12, in accordance with the teachings of the embodiments described throughout this disclosure. In step S114 (which may be optional), the WD 14 receives the user data carried in the transmission.

Figures 21, 22:
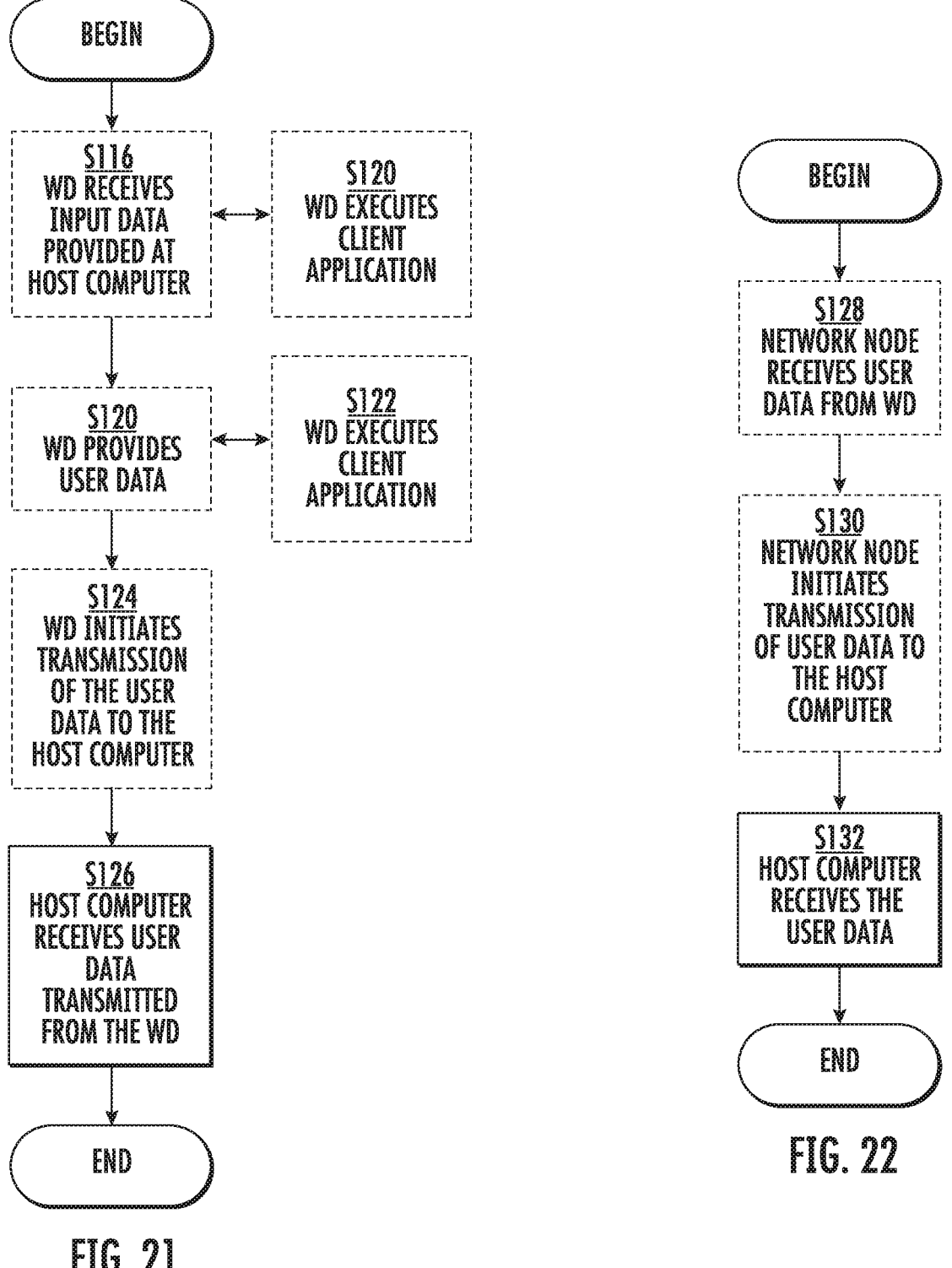
FIG. 21 illustrates example methods implemented in a communication system including a host computer, a base station and a user equipment in accordance with some embodiments.
FIG. 22 illustrates example methods implemented in a communication system including a host computer, a base station and a user equipment in accordance with some embodiments.

FIG. 21 is a flowchart illustrating a method implemented in a communication system, in accordance with one embodiment. The communication system includes a host computer 144, a network node 12 and a WD 14 which may be those described with reference to FIGS. 17 and 18. For simplicity of the present disclosure, only drawing references to FIG. 21 will be included in this section. In step S116 (which may be optional), the WD 14 receives input data provided by the host computer 144. Additionally or alternatively, in step S118, the WD 14 provides user data. In substep S120 (which may be optional) of step S118, the WD 14 provides the user data by executing a client application 190. In substep S122 (which may be optional) of step S116, the WD 14 executes a client application 190 which provides the user data in reaction to the received input data provided by the host computer 144. In providing the user data, the executed client application 190 may further consider user input received from the user. Regardless of the specific manner in which the user data was provided, the WD 14 initiates, in substep S124 (which may be optional), transmission of the user data to the host computer 144. In step S126 of the method, the host computer 144 receives the user data transmitted from the WD 14, in accordance with the teachings of the embodiments described throughout this disclosure.

FIG. 22 is a flowchart illustrating a method implemented in a communication system, in accordance with one embodiment. The communication system includes a host computer 144, a network node 12 and a WD 14 which may be those described with reference to FIGS. 17 and 18. For simplicity of the present disclosure, only drawing references to FIG. 22 will be included in this section. In step S128 (which may be optional), in accordance with the teachings of the embodiments described throughout this disclosure, the network node 12 receives user data from the WD 14. In step S130

(which may be optional), the network node 12 initiates transmission of the received user data to the host computer 144. In step S132 (which may be optional), the host computer 144 receives the user data carried in the transmission initiated by the network node 12.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 23:
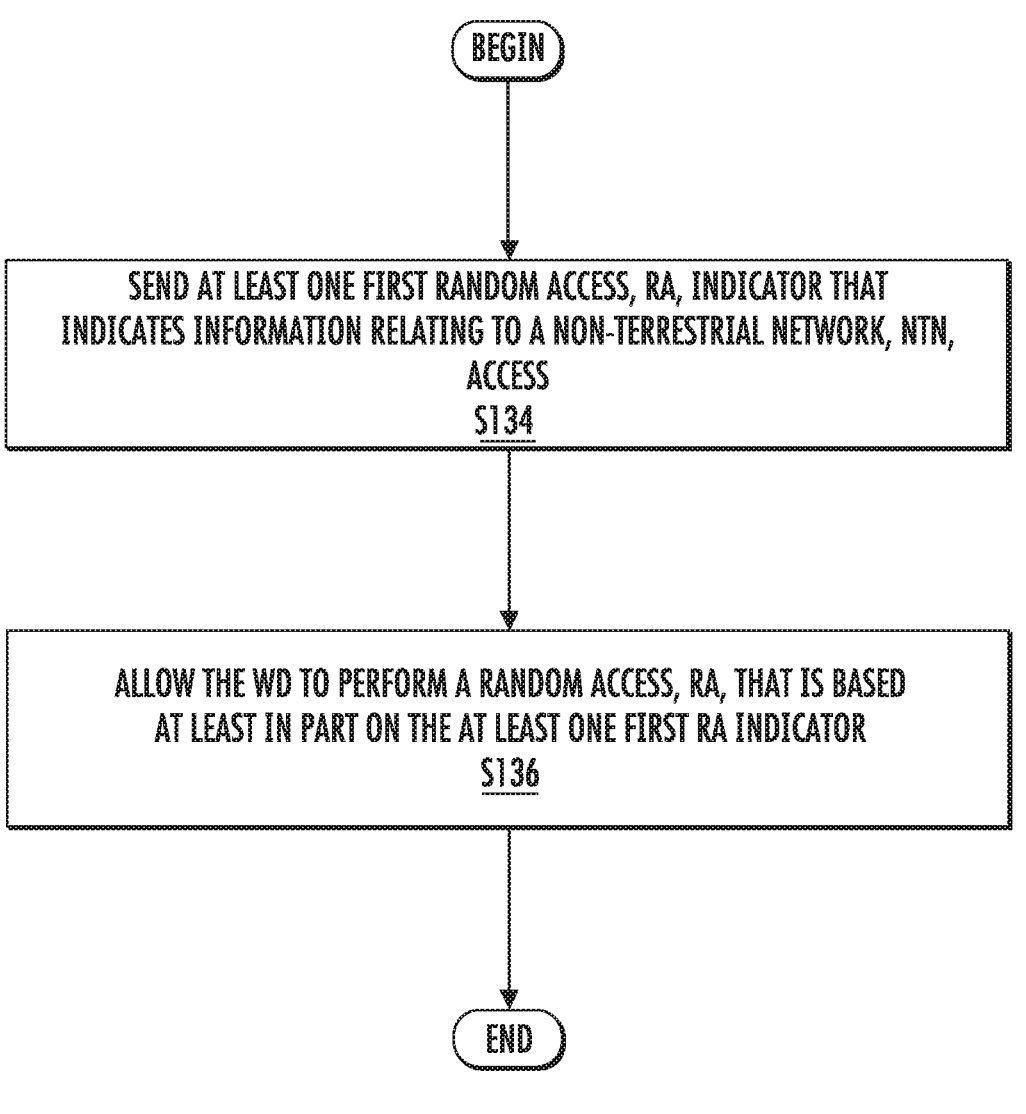
FIG. 23 is a flowchart of an example method for a network node according to one embodiment of the present disclosure.

FIG. 23 is a flowchart of an example process in a network node 12 according to some embodiments of the present disclosure. One or more Blocks and/or functions and/or methods performed by the network node 12 may be performed by one or more elements of network node 12 such as by processing circuitry 16, memory such as readable medium 18, interface 20, processing circuitry 178, communication interface 170, etc. or any other hardware in a network node 12 according to the example method. The example method includes sending (Block S134), such as by processing circuitry 16, memory such as readable medium 18, interface 20, processing circuitry 178, communication interface 170, etc., at least one first random access, RA, indicator that indicates information relating to a non-terrestrial network, NTN, access. The method includes allowing (Block S136), such as by processing circuitry 16, memory such as readable medium 18, interface 20, processing circuitry 178, communication interface 170, etc., the WD to perform a random access, RA, that is based at least in part on the at least one first RA indicator.

In some embodiments, the at least one first RA indicator indicates a first PRACH format to use to access the NTN. In some embodiments, the at least one first RA indicator indicates a first random access, RA, procedure to use to access the NTN. In some embodiments, the method further includes sending, such as by processing circuitry 16, memory such as readable medium 18, interface 20, processing circuitry 178, communication interface 170, etc., at least one second RA indicator that indicates information relating to a terrestrial network, TN, access; and wherein one or more of: the at least one first RA indicator is different from the at least one second RA indicator, the at least one second RA indicator being to access to the TN and the NTN; the first PRACH format to use to access the NTN is different from a second PRACH format to use to access the TN, the second PRACH format being also to access the NTN; and/or the first RA procedure to use to access the NTN is different from a second RA procedure to use to access the TN, the second RA procedure being also to access the NTN.

In some embodiments, the method further includes associating, such as by processing circuitry 16, memory such as readable medium 18, interface 20, processing circuitry 178, communication interface 170, etc., a first WD capability with a second WD capability from a predetermined set of a plurality of capability types. In some embodiments, the plurality of capability types comprises one or more of: a first type indicating that the WD does not support a global navigation satellite system, GNSS; a second type indicating that the WD supports the GNSS and is incapable of uplink time and/or frequency pre-compensation before initiating a random access, RA, procedure; and a third type indicating that the WD supports the GNSS and is capable of uplink time and/or frequency pre-compensation before initiating the RA procedure.

In some embodiments, associating the first WD capability with the second WD capability comprises associating, such as by processing circuitry 16, memory such as readable medium 18, interface 20, processing circuitry 178, communication interface 170, etc., a capability to support a 2-step RA procedure with a capability to perform a random access, RA, procedure to access the NTN without an uplink time and/or frequency pre-compensation. In some embodiments, associating the first WD capability with the second WD capability comprises associating, such as by processing circuitry 16, memory such as readable medium 18, interface 20, processing circuitry 178, communication interface 170, etc., a capability to support a shared spectrum channel access with a capability to perform a random access, RA, procedure to access the NTN without an uplink time and/or frequency pre-compensation.

In some embodiments, the at least one first RA indicator comprises a parameter that identifies a PRACH format to use to access the NTN and an RA procedure to use to access the NTN, the parameter being a part of a predetermined set of a plurality of parameters. In some embodiments, the plurality of parameters comprises one or more of: a first parameter that identifies a first PRACH format to use to access the NTN and a first RA procedure to use to access the NTN, the first PRACH format being specific to the NTN access and the first RA procedure being also for a terrestrial network, TN, access; a second parameter that identifies a second PRACH format to use to access the NTN and a second RA procedure to use to access the NTN, the second PRACH format being also for TN access and the second RA procedure being specific to NTN access; and a third PRACH format to use to access the NTN and a third RA procedure to use to access the NTN, the third PRACH format being specific to NTN access and the third RA procedure being specific to NTN access.

In some embodiments, one or more of: the first and/or third PRACH formats that are specific to the NTN access are based on two Zadoff-Chu sequences; the second PRACH format that is also for TN access is based on a single Zadoff-Chu sequence; the second and/or third RA procedures that are specific to the NTN access comprise a modification to an RA procedure for TN access; and the first RA procedure that is also for TN access is one of a 4-step and a 2-step RA procedure. In some embodiments, the modification comprises an uplink time and/or frequency pre-compensation to be performed before initiation of the RA procedure. In some embodiments, at least one of the at least one first RA indicator that indicates information relating to the NTN access is received in one of: a radio resource control, RRC, signaling; a cell specific signaling; and a WD specific signaling.

In some embodiments, the at least one first RA indicator comprises a first information that is broadcasted in system information, SI, and a second information that indicates a physical random access channel, PRACH, configuration that is specific to the NTN access. In some embodiments, the first information that is broadcasted in the SI indicates whether WDs with a global navigation satellite system, GNSS, capability are allowed to use the PRACH configuration that is specific to the NTN access. In some embodiments, the at least one first RA indicator comprises information that indicates whether a serving cell provided by the network node supports a NTN specific random access, RA, type. In some embodiments, the at least one first RA indicator comprises information that indicates a common physical random access channel, PRACH, configuration within at least one of a common PRACH configuration information element, IE, and a bandwidth part, BWP, uplink common information element, IE.

In some embodiments, the at least one first RA indicator comprises information that indicates a dedicated physical random access channel, PRACH, configuration within at least one of a dedicated PRACH configuration information element, IE, and a bandwidth part, BWP, uplink common information element, IE. In some embodiments, allowing the WD to perform the RA that is based at least in part on the at least one first RA indicator comprises allowing, such as by processing circuitry 16, memory such as readable medium 18, interface 20, processing circuitry 178, communication interface 170, etc., the WD to initiate access to the NTN according to an RA type, the RA type to initiate access to the NTN being one of an NTN-specific RA type and a conventional TN RA type, the one of the NTN-specific RA type and the conventional TN RA type being based at least in part on whether the RA is a contention-free or contention-based.

In some embodiments, when the RA is contention-free, allowing the WD to initiate access to the NTN based at least in part on a global navigation satellite system, GNSS, capability of the WD. In some embodiments, when the RA is contention-based, allowing the WD to initiate the access to the NTN based at least in part on an assumption that different physical random access channel, PRACH, resources are used for the NTN-specific RA type and the conventional TN RA type.

In some embodiments, allowing the WD to perform the RA that is based at least in part on the at least one first RA indicator comprises receiving, such as by processing circuitry 16, memory such as readable medium 18, interface 20, processing circuitry 178, communication interface 170, etc., an RA preamble and sending an RA response according to at least one of the at least one first RA indicator to allow the WD to access the NTN.

Figure 24:
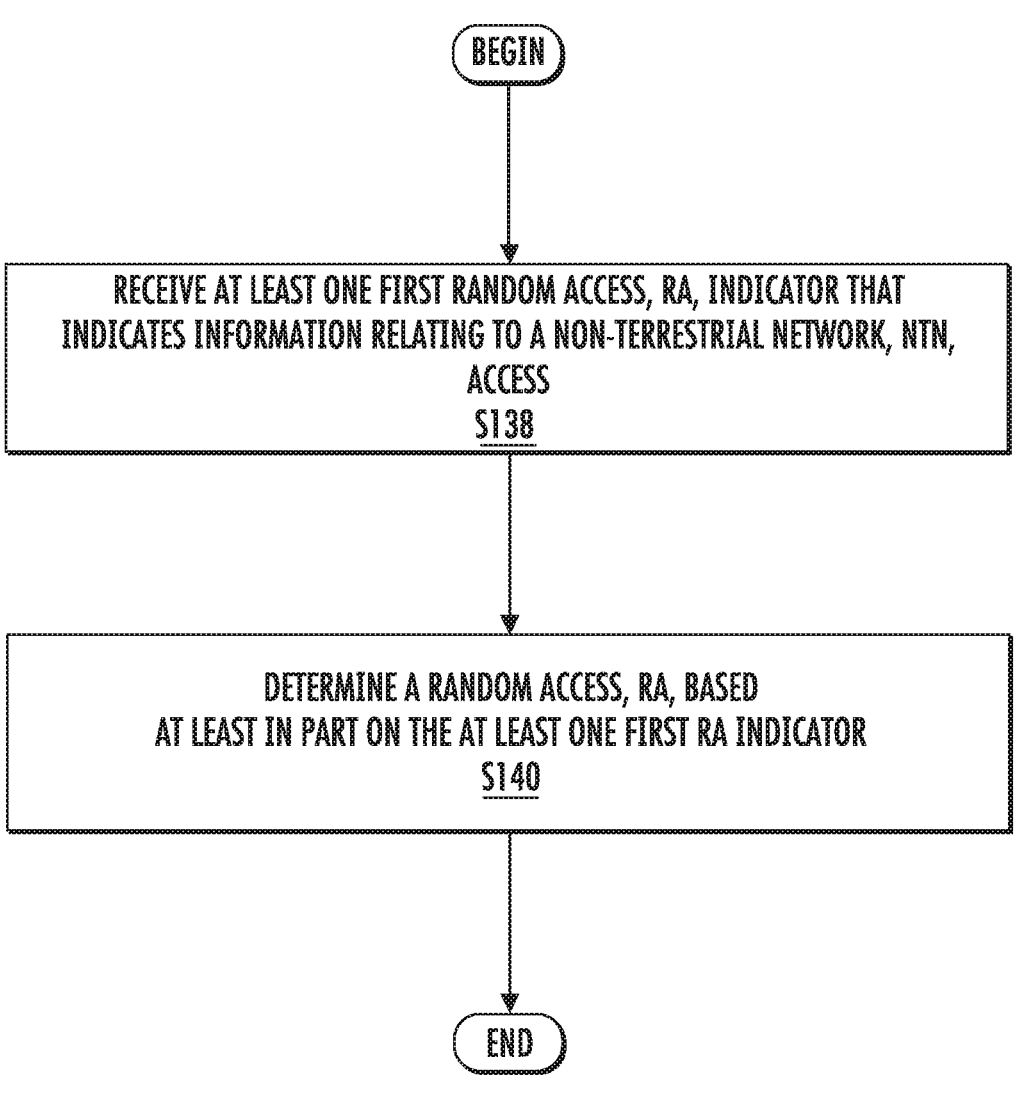
FIG. 24 is a flowchart of an example method for a wireless device according to one embodiment of the present disclosure.

FIG. 24 is a flowchart of an example process in a wireless device 14 according to some embodiments of the present disclosure. One or more Blocks and/or functions and/or methods performed by WD 14 may be performed by one or more elements of WD 14 such as by processing circuitry 46, memory such as readable medium 48, interface 44, processing circuitry 186, radio interface 184, or any other hardware in a WD 14, etc. The example method includes receiving (Block S138), such as by processing circuitry 46, memory such as readable medium 48, interface 44, processing circuitry 186, radio interface 184, or any other hardware in a WD 14, etc., at least one first random access, RA, indicator that indicates information relating to a non-terrestrial network, NTN, access. The method includes determining (Block S140), such as by processing circuitry 46, memory such as readable medium 48, interface 44, processing circuitry 186, radio interface 184, or any other hardware in a WD 14, etc., a random access, RA, based at least in part on the at least one first RA indicator.

In some embodiments, the at least one first RA indicator indicates a first PRACH format to use to access the NTN. In some embodiments, the at least one first RA indicator indicates a first random access, RA, procedure to use to access the NTN. In some embodiments, the method further includes receiving, such as by processing circuitry 46, memory such as readable medium 48, interface 44, processing circuitry 186, radio interface 184, or any other hardware in a WD 14, etc., at least one second RA indicator that indicates information relating to a terrestrial network, TN, access; and wherein one or more of: the at least one first RA indicator is different from the at least one second RA indicator, the at least one second RA indicator being to access to the TN and the NTN; the first PRACH format to use to access the NTN is different from a second PRACH format to use to access the TN, the second PRACH format being also to access the NTN; and/or the first RA procedure to use to access the NTN is different from a second RA procedure to use to access the TN, the second RA procedure being also to access the NTN.

In some embodiments, the method further includes associating, such as by processing circuitry 46, memory such as readable medium 48, interface 44, processing circuitry 186, radio interface 184, or any other hardware in a WD 14, etc., a first WD capability with a second WD capability from a predetermined set of a plurality of capability types. In some embodiments, the plurality of capability types comprises one or more of: a first type indicating that the WD does not support a global navigation satellite system, GNSS; a second type indicating that the WD supports the GNSS and is incapable of uplink time and/or frequency pre-compensation before initiating a random access, RA, procedure; and a third type indicating that the WD supports the GNSS and is capable of uplink time and/or frequency pre-compensation before initiating the RA procedure.

In some embodiments, associating the first WD capability with the second WD capability comprises associating, such as by processing circuitry 46, memory such as readable medium 48, interface 44, processing circuitry 186, radio interface 184, or any other hardware in a WD 14, etc., a capability to support a 2-step RA procedure with a capability to perform a random access, RA, procedure to access the NTN without an uplink time and/or frequency pre-compensation. In some embodiments, associating the first WD capability with the second WD capability comprises associating, such as by processing circuitry 46, memory such as readable medium 48, interface 44, processing circuitry 186, radio interface 184, or any other hardware in a WD 14, etc., a capability to support a shared spectrum channel access with a capability to perform a random access, RA, procedure to access the NTN without an uplink time and/or frequency pre-compensation.

In some embodiments, the at least one first RA indicator comprises a parameter that identifies a PRACH format to use to access the NTN and an RA procedure to use to access the NTN, the parameter being a part of a predetermined set of a plurality of parameters. In some embodiments, the plurality of parameters comprises one or more of: a first parameter that identifies a first PRACH format to use to access the NTN and a first RA procedure to use to access the NTN, the first PRACH format being specific to the NTN access and the first RA procedure being also for a terrestrial network, TN; a second parameter that identifies a second PRACH format to use to access the NTN and a second RA procedure to use to access the NTN, the second PRACH format being also for TN access and the second RA procedure being specific to NTN access; and a third PRACH format to use to access the NTN and a third RA procedure to use to access the NTN, the third PRACH format being specific to NTN access and the third RA procedure being specific to NTN access.

In some embodiments, one or more of: the first and/or third PRACH formats that are specific to the NTN access are based on two Zadoff-Chu sequences; the second PRACH format that is also for TN access is based on a single Zadoff-Chu sequence; the second and/or third RA procedures that are specific to the NTN access comprise a modification to an RA procedure for TN access; and the first RA procedure that is also for TN access is one of a 4-step and a 2-step RA procedure. In some embodiments, the modification comprises an uplink time and/or frequency pre-compensation to be performed before initiation of the RA procedure.

In some embodiments, at least one of the at least one first RA indicator that indicates information relating to the NTN access is received in one of: a radio resource control, RRC, signaling; a cell specific signaling; and a WD specific signaling. In some embodiments, the at least one first RA indicator comprises a first information that is broadcasted in system information, SI, and a second information that indicates a physical random access channel, PRACH, configuration that is specific to the NTN access. In some embodiments, the first information that is broadcasted in the SI indicates whether WDs with a global navigation satellite system, GNSS, capability are allowed to use the PRACH configuration that is specific to the NTN access.

In some embodiments, the at least one first RA indicator comprises information that indicates whether a serving cell provided by the network node supports a NTN specific random access, RA, type. In some embodiments, the at least one first RA indicator comprises information that indicates a common physical random access channel, PRACH, configuration within at least one of a common PRACH configuration information element, IE, and a bandwidth part, BWP, uplink common information element, IE. In some embodiments, the at least one first RA indicator comprises information that indicates a dedicated physical random access channel, PRACH, configuration within at least one of a dedicated PRACH configuration information element, IE, and a bandwidth part, BWP, uplink common information element, IE.

In some embodiments, determining the RA based at least in part on the at least one first RA indicator comprises determining, such as by processing circuitry 46, memory such as readable medium 48, interface 44, processing circuitry 186, radio interface 184, or any other hardware in a WD 14, etc., an RA type to initiate access to the NTN to be one of an NTN-specific RA type and a conventional TN RA type, the one of the NTN-specific RA type and the conventional TN RA type to initiate access to the NTN being based at least in part on whether the RA is a contention-free or contention-based. In some embodiments, when the RA is contention-free, determining, such as by processing circuitry 46, memory such as readable medium 48, interface 44, processing circuitry 186, radio interface 184, or any other hardware in a WD 14, etc., the RA type to initiate access to the NTN based at least in part on a global navigation satellite system, GNSS, capability of the WD.

In some embodiments, when the RA is contention-based, determining, such as by processing circuitry 46, memory such as readable medium 48, interface 44, processing circuitry 186, radio interface 184, or any other hardware in a WD 14, etc., the RA type to initiate access to the NTN based at least in part on an assumption that different physical random access channel, PRACH, resources are used for the NTN-specific RA type and the conventional TN RA type. In some embodiments, determining the RA based at least in part on the at least one first RA indicator comprises performing, such as by processing circuitry 46, memory such as readable medium 48, interface 44, processing circuitry 186, radio interface 184, or any other hardware in a WD 14, etc., the RA to the NTN using at least one of the at least one first RA indicator.

As described above, some embodiments herein relate to NTN WD 14 capability definitions, capability reporting and NTN-specific RA indication. As used herein, the term "NTN-specific RA" means a random access type using different random access resources and associated procedures in addition to, and/or in comparison to "normal RA", or conventional RA, where "normal RA" as used herein may refer to, e.g. existing or conventional, TN RA, and/or a RA with PRACH configurations of 4-step RACH or 2-step RACH as defined for NR in 3GPP release 15 and release 16.

Some embodiments focus on determining the RA type in one cell.

Different WD Capabilities for NR Over NTN Operation

In some embodiments, the different WD 14 capabilities may be defined as:

Type I: WD 14 is not equipped with GNSS

Type II: WD 14 is equipped with GNSS but is not capable of uplink time/frequency pre-compensation before initiating random access procedure Type III: WD 14 is equipped with GNSS and is capable of uplink time/frequency pre-compensation before initiating random access procedure. In the sequel, WD 14 with GNSS capabilities may refer to Type III WD, and WD without GNSS capabilities refers to either Type I or Type II WD.

In some embodiments, the different WD 14 capabilities on uplink time/frequency pre-compensation before initiating random access procedure is associated to WD 14 capabilities on one or more of the following:

Support of 2-step RA type (e.g., when a WD 14 is capable of a 2-step RA type, the WD 14 may be assumed to be capable of doing random access in NTN without uplink time/frequency pre-compensation, since a 40 ms random access response window is already supported); and Support of operation with shared spectrum channel access (unlicensed band operation) (e.g., when a WD 14 is capable of operation with shared spectrum channel access, the WD 14 may be assumed to be capable of doing random access in NTN without uplink time/ frequency pre-compensation, since a 40 ms random access response window is also supported).

Methods for Indicating NTN-Specific Random Access Procedure

In some embodiments, a parameter is explicitly defined in RRC signaling to inform the WDs 14 that whether one or more sets of the PRACH configurations (e.g., PRACH formats) and the associated random access procedures are to be used for NTN.

In one example, a parameter is defined to configure the use of a new PRACH format defined for NTN together with the use of existing 4-step RACH or 2-step RACH. Here, a new PRACH format for NTN may for example refer to a new PRACH format with two Zadoff-Chu sequences.

In another example, a parameter is defined to configure the use of an existing PRACH format together with the As an example, a cell-specific parameter NTN-RAtype is included in an IE RACH-ConfigCommonNTN, to enable an NTN-specific RA type with separate PRACH configurations compared to random access in TN (Terrestrial Network).

For example, NTN-RAtype, e.g., for enabling NTN-specific RA type:

```
RACH-ConfigCommonNTN-r17 :=      Sequence {
...
   NTN-RAtype-r17                 ENUMERATED {enabled}
   OPTIONAL, -- Need R
...
}
```

The RRC signaling may also be dedicated signaling e.g., NTN-RAtype is provided in RACH-ConfigDedicated IE for contention free random access in NTN. As an example:

```
RACH-ConfigDedicated ::=         Sequence {
   cfra                          CFRA
OPTIONAL, -- Need S
   ra-Prioritization             RA-Prioritization
OPTIONAL, -- Need N
   ...,
   [[
   Ra-PrioritizationTwoStep-r16       RA-Prioritization
OPTIONAL, -- Need N
   cfra-TwoStep-r16              CFRA-TwoStep-r16
OPTIONAL -- Need N
   ]]
   NTN-RAtype-r17                    ENUMERATED {enabled}
OPTIONAL, -- Need R
}
``` use of modified RACH procedure for NTN. Here, a modified RACH procedure for NTN may for example refer to a RACH procedure where the WD 14 applies uplink time/frequency pre-compensation before initiating random access procedure.

In yet another example, a parameter is defined to configure the use of a new PRACH format defined for NTN together with the use of modified RACH procedure for NTN. Here, a new PRACH format for NTN may for example refer to a new PRACH format with two Zadoff-Chu sequences, and a modified RACH procedure for NTN may for example refer to a RACH procedure where the WD 14 applies uplink time/frequency pre-compensation before initiating random access procedure.

Thus, multiple parameters may be defined, with each referring to one of the examples above. Below it is used a generic parameter "NTN-RAtype" to describe the signaling according to some embodiments, with the understanding that it can refer to any of the examples described above and there may be multiple parameters that do not have to bear the same name "NTN-RAtype".

The RRC signaling may be cell-specific signaling, which can be used for contention based random access (CBRA) or contention free random access (CFRA) in NTN, In some embodiments, additional information can be broadcast in the SI to cater to the case where the network (e.g., network node 12) serves WDs 14 with different GNSS capabilities. For example, the additional information may include:

whether WDs 14 equipped with GNSS capability are allowed to use NTN-specific PRACH formats and the associated random access procedure.

In some embodiments, whether NTN-specific RA type is supported depends on whether the PRACH resources are configured, wherein the PRACH resources can be provided by a common PRACH configuration and/or dedicated PRACH configuration. As an example, if a common PRACH configuration rach-ConfigCommonNTN-r17 is provided in the BWP-UplinkCommon IE, the serving cell supports NTN-specific RA type.

```
-- ASN1START
-- TAG-BWP-UPLINKCOMMON-START
BWP-UplinkCommon ::=              Sequence {
   genericParameters            BWP,
   rach-ConfigCommon            SetupRelease { RACH-ConfigCommon }
OPTIONAL, -- Need M
   pusch-ConfigCommon           SetupRelease { PUSCH-ConfigCommon
}
OPTIONAL, -- Need M
   pucch-ConfigCommon           SetupRelease { PUSCH-ConfigCommon
}
OPTIONAL, Need — M ...,
   [[
   rach-ConfigCommonTwoStepRA-r16   SetupRelease { RACH-
ConfigCommonTwoStepRA-16 }
OPTIONAL, -- Need M
   msgA-PUSCH-Config-r16        SetupRelease { MsgA-PUSCH-Config-
r16 }
OPTIONAL — Need M
   ]]
   rach-ConfigCommonNTN-r17     SetupRelease { Rach-
ConfigCommonNTN-r17 }
OPTIONAL, -- Need M
}
     -- TAG-BWP-UPLINKCOMMON-STOP
     -- ASN1STOP
```

As another example, if a dedicated PRACH configuration cfra-NTN-r17 is provided in the RACH-ConfigDedicated IE, the WD 14 is to use NTN-specific RA type for CFRA.

```
RACH-ConfigDedicated ::=         Sequence {
   Cfra                         CFRA
OPTIONAL, -- Need S
   ra-Prioritization            RA-Prioritization
OPTIONAL, -- Need N ...,
   [[
   ra-PrioritizationTwoStep-r16   RA-Prioritization
OPTIONAL, -- Need N
```

-continued

```
   cfra-TwoStep-r16             CFRA-TwoStep-r16
OPTIONAL — Need N
   ]]
   cfra-NTN-r17
OPTIONAL —Need N
}
```

As a 3$^{rd}$ example, for beam failure recovery, if a dedicated PRACH configuration cfra-NTN-r17 is provided in the BWP-UplinkCommon IE, the serving cell supports NTN-specific RA type.

```
BeamFailureRecoveryConfig :=     Sequence {
   rootSequenceIndex-BFR        INTEGER (0..137)
OPTIONAL, -- Need M
      rach-ConfigBFR            RACH-ConfigGeneric
OPTIONAL, -- Need M
      Rsrp-ThresholdSSB         RSRP-Range
OPTIONAL, -- Need M
      candidateBeamRSList       Sequence (SIZE(1..maxNrofCandidate Beams)) OF
PRACH — ResourceDedicatedBFR OPTIONAL, -- Need M
   ssb-perRACH-Occasion         ENUMERATED {oneEight, oneFourth, oneHalf,
one, two, four, eight, sixteen)
OPTIONAL, -- Need M
   ra-ssb-OccasionMaskIndex     INTEGER (0..15)
OPTIONAL, -- Need M
   recovery SearchSpaceID       SearchSpaceID
OPTIONAL, -- Need R
   ra-Prioritization            RA-Prioritization
OPTIONAL, -- Need R
   beamFailureRecoveryTimer     ENUMERATED (ms10, ms20, ms40, ms60,
ms80, ms100,
ms150, ms200)        OPTIONAL, -- Need M ...,
   [[
   msg1-SubcarrierSpacing       SubcarrierSpacing
OPTIONAL — Need M
   ]],
   [[
```

-continued

| | |
|---|---|
| ra-PrioritizationTwoStep-r16 | RA-Prioritization |
| OPTIONAL —Need R | |
| ]] | |
| cfra-NTN-r17 | CFRA-TwoStep-r17 |
| OPTIONAL - Need N | |
| } | |

In some embodiments, which RA type is used in NTN cell depends on whether the random access is a CFRA or a CBRA.

In CFRA, the RA type determination can be based on the WD 14 capability of GNSS which is known by the network node 12 and the preamble transmission and reception can be aligned on the WD 14 and network node 12 side.

In CBRA, the capability of a WD 14 with a preamble detected by the network node 12 may not be known by the network node 12. In this case, both network node 12 and WD 14 may assume different PRACH resources are used for NTN-specific RA and normal RA, wherein the PRACH resources can be one or more of the following:

Preamble identifiers (IDs);

PRACH occasions; and

Preamble format, PRACH sequences.

For example, on the network node 12 side if 2 separate PRACH configurations are used for normal random access and NTN-specific random access respectively, the network node 12 may try to receive both types of RA at the same time, while WD 14 will select a RA type based on its capability.

Below, wireless communication network should be such network as discussed above, e.g., NR based network or a 3GPP 5G network, such as comprising a RAN, e.g., NG-RAN, and a core network, e.g., 5GC. Wireless device may be a wireless communication device for communication with and/or via the wireless communication network, i.e., configured to be served by the wireless communication network. The wireless communication network and/or the wireless device should support and/or be configured for NTN communication between each other, e.g., communication between the wireless devices and the wireless communication network may be via radio network node of the RAN, that involves, e.g., corresponds to or comprises, an air or space bourne unit, such as a UAV or satellite, e.g., LEO, with radio interface to the wireless device, i.e., the wireless communication between the wireless device and the wireless communication network is via this radio interface. As used below, NTN access may refer to network access via or to a NTN, e.g., to the wireless communication network when it corresponds to or comprise a NTN. As used herein, specific for NTN, may further mean specifically to be used and/or suitable for NTN, e.g., NTN access, which may exclude use or suitability for TN, e.g., TN access.

Some embodiments may include one or more of the following:

Group A

1. A method, performed by a wireless device, relating to how an NTN can be accessed, the method comprising: receiving, from the wireless communication network, one or more indicators, e.g., parameters, indicating PRACH configuration(s), e.g., format(s), and/or RA procedure(s) for NTN access use, at least one thereof being specific for NTN access use.

This method (embodiment 1) of the Group A embodiments is intended to cover "receiving side" embodiments corresponding to the "transmitting side" embodiments below under "Group B Embodiments", 7-11, i.e., corresponding embodiments are included here as well but for, i.e., from the perspective of, the wireless device. In other words, the wireless device, the wireless communication device, and the one or more indictors mentioned for embodiment 3 may be as below under "Group B Embodiments", 7-11.

2. The method of any one of embodiments 2-3, wherein associating the wireless device with said certain one or more second capabilities comprises associating support of a 2-step RA procedure, e.g., as described above, with a capability of doing random access in the NTN without uplink time and/or frequency pre-compensation.

3. The method of any one of embodiments 2-4, wherein associating the wireless device with said certain one or more second capabilities comprises associating support of operation with shared spectrum channel access, e.g., for unlicensed band operation, with a capability of doing random access in the NTN without uplink time and/or frequency pre-compensation.

4. The method of any of the previous embodiments, further comprising:

providing user data; and forwarding the user data to a host computer via the transmission to the base station.

Group B

Below method(s) and action(s) are typically performed by a radio network node, e.g., base station, of the below mentioned wireless communication network. The wireless device may be served by the wireless communication network, e.g., by the radio network node, such as in a cell or radio coverage area provided by the wireless communication network and/or the radio network node. The wireless communication network typically corresponds to or comprise the below mentioned NTN.

5. A method, performed by a wireless communication network, for indicating how an NTN can be accessed, the method comprising:

transmitting, to the wireless device, one or more indicators, e.g., parameters, indicating PRACH configuration(s), e.g., format(s), and/or RA procedure(s) for NTN access use, at least one thereof being specific for NTN access use.

The transmitted indicator(s) may then be used by the wireless device to access the NTN, e.g., to perform RA.

6. The method of embodiment 7, wherein said one or more indicators comprises a first identifier, e.g., a parameter, preferably transmitted via RRC signaling, identifying PRACH configuration(s), e.g., format(s), and/or RA procedure(s) for NTN access use, wherein the first identifier is part of a predefined set that comprises one or more of the following predetermined parameters, and/or the first identifier is a parameter that is any one of the following predetermined parameters:

a first predetermined parameter identifying a first PRACH format and a first RA procedure, which first PRACH format is specific for NTN access use while said first RA procedure is also for TN access use, e.g., such 4-step RACH or 2-step RACH procedures as described above, a second predetermined parameter identifying a second PRACH format and second RA procedure, which second PRACH format is also for TN access use while said second RA procedure is specific for NTN access use, e.g., a modified RACH procedure for TN access and/or based on that wireless device applies uplink time and/or frequency pre-compensation before initiating the RA procedure, a third predetermined parameter identifying a third PRACH format and a third RA procedure, which third PRACH format is specific for NTN access use and said third RA procedure is specific for NTN access use, e.g., a modified RACH procedure for TN access and/or based on that wireless device applies uplink time and/or frequency pre-compensation before initiating the RA procedure.

Said first and/or said third PRACH format, specific for NTN access use may be based on two Zadoff-Chu sequences, e.g., as described above.

The RRC signaling may be cell specific signaling and may involve a cell specific parameter, e.g., the first identifier above. This supports and can be used for contention based random access (CBRA) and/or contention free random access (CFRA). The cell specific parameter, e.g., the first identifier above, may be comprised in an information element that may correspond to the IE RACH-ConfigCommon-NTN as exemplified above. The cell specific parameter, e.g., the first identifier above, may correspond to the "NTN-RAtype" also exemplified above.

The RRC signaling may be dedicated signaling and may involve a parameter, e.g., the first identifier above. This supports and can be used for contention free random access (CFRA). The parameter, e.g., the first identifier above may be comprised in an information element that may correspond to the RACH-ConfigDedicated IE as exemplified above. The parameter, e.g., the first identifier above, may correspond to the "NTN-RAtype" also exemplified above.

7. The method of any one of embodiments 7-8, wherein said one or more indicators comprises information broadcasted to the wireless device, e.g., in SI, indicating whether wireless devices equipped with GNSS capability are and/or are not allowed to use one or more of said PRACH configuration(s), e.g., format(s), and/or RA procedure(s) that is/are specific for NTN access.

8. The method of any one of embodiments 7-9, wherein said one or more indicators comprises one or more second identifiers identifying if a serving cell supports a NTN specific RA type.

Said second identifier(s) may correspond to one or more of the following: an indication of a common PRACH configuration in a certain information element, e.g., in the BWP-UplinkCommon IE as exemplified above, wherein the indication of the common PRACH configuration here may correspond to the "rach-ConfigCommonNTN" or "rach-ConfigCommonNTN-r17" also exemplified above, an indication of a dedicated PRACH configuration in a certain information element, e.g., in the RACH-ConfigDedicated IE as exemplified above, wherein the indication of the dedicated PRACH configuration here may correspond to the "cfra-NTN" or "cfra-NTN-r17" also exemplified above, an indication of another dedicated PRACH configuration in a certain information element associated with beam failure recovery, e.g., in the BWP-UplinkCommon IE as exemplified above. The indication of the common PRACH configuration may here correspond to the "cfra-NTN" or "cfra-NTN-r17" also exemplified above.

9. The method of any one of embodiments 7-10, wherein said one or more indicators and/or which of said one or more indicators considered by the wireless device are based on if the RA is CFRA or a CBRA.

If the RA is CFRA said one or more indicators and/or which of said one or more indicators considered by the wireless device may be based on GNSS capability and/or support of the wireless device. Preamble transmission and reception may be aligned on the wireless device and wireless communication network sides.

If the RA is CBRA said one or more indicators and/or which of said one or more indicators considered by the wireless device may be based on assumption that different PRACH resources are used for NTN-specific RA and other, e.g., conventional RA such as for TN, and/or that the wireless device will select a suitable RA type depending on its capability.

10. A method, performed by a wireless communication network, for supporting access of a wireless device to an NTN, the method comprising:

associating, based on one or more first capabilities of the wireless device, the wireless device with certain one or more second capabilities for use when accessing the NTN.

11. The method of embodiment 12, wherein associating the wireless device with said certain one or more second capabilities comprises associating the wireless device with a capability type from a predetermined set of capability types that comprises one or more of the following types:

a first type indicating that the wireless device does not support, e.g., is not equipped with, GNSS, a second type indicating that the wireless device support GNSS and is not capable of uplink time and/or frequency pre-compensation before initiating a random access procedure, and a third type indicating that the wireless device support GNSS and is capable of uplink time and/or frequency pre-compensation before initiating a random access procedure.

12. The method of any one of embodiments 12-13, wherein associating the wireless device with said certain one or more second capabilities comprises associating support of a 2-step RA procedure, e.g., as described above, with a capability of doing random access in the NTN without uplink time and/or frequency pre-compensation.

13. The method of any one of embodiments 12-14, wherein associating the wireless device with said certain one or more second capabilities comprises associating support of operation with shared spectrum channel access, e.g., for unlicensed band operation, with a capability of doing random access in the NTN without uplink time and/or frequency pre-compensation.

Group C

14. A wireless device configured to perform the method and/or actions of one or more of the Group A embodiments.

The wireless device may comprise processing circuitry configured to perform to perform the method and/or actions of one or more of the Group A embodiments. The wireless device may also comprise further circuitry, e.g., memory, and power supply circuitry configured to supply power to the wireless device.

15. A wireless communication network, e.g., network node(s) or radio network node(s) thereof, configured to perform the method and/or actions of one or more of the Group B embodiments.

The wireless communication network may comprise processing circuitry configured to perform to perform the method and/or actions of one or more of the Group B embodiments. The wireless communication network may also comprise further circuitry, e.g., memory, and power supply circuitry configured to supply power to the wireless device.

16. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

17. A communication system including a host computer comprising:

processing circuitry configured to provide user data; and a communication interface configured to forward the user data to a cellular network for transmission to a user equipment (UE), wherein the cellular network comprises a radio network node having a radio interface and processing circuitry, the radio network node's processing circuitry configured to perform any of the steps of any of the Group B embodiments.

18. The communication system of the pervious embodiment further including the radio network node.

19. The communication system of the previous 2 embodiments, further including the UE, wherein the UE is configured to communicate with the base station.

20. The communication system of the previous 3 embodiments, wherein:

the processing circuitry of the host computer is configured to execute a host application, thereby providing the user data; and the UE comprises processing circuitry configured to execute a client application associated with the host application.

21. A method implemented in a communication system including a host computer, a radio network node and a user equipment (UE), the method comprising:

at the host computer, providing user data; and at the host computer, initiating a transmission carrying the user data to the UE via a cellular network comprising the radio network node, wherein the radio network node performs any of the steps of any of the Group B embodiments.

22. The method of the previous embodiment, further comprising, at the radio network node, transmitting the user data.

23. The method of the previous 2 embodiments, wherein the user data is provided at the host computer by executing a host application, the method further comprising, at the UE, executing a client application associated with the host application.

24. A user equipment (UE) configured to communicate with a radio network node, the UE comprising a radio interface and processing circuitry configured to performs the of the previous 3 embodiments.

25. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

26. The communication system of the previous embodiment, wherein the cellular network further includes a radio network node configured to communicate with the UE.

27. The communication system of the previous 2 embodiments, wherein:

the processing circuitry of the host computer is configured to execute a host application, thereby providing the user data; and the UE's processing circuitry is configured to execute a client application associated with the host application.

28. A method implemented in a communication system including a host computer, a radio network node and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

29. The method of the previous embodiment, further comprising at the UE, receiving the user data from the radio network node.

30. A communication system including a host computer comprising:

communication interface configured to receive user data originating from a transmission from a user equipment (UE) to a radio network node, wherein the UE comprises a radio interface and processing circuitry, the UE's processing circuitry configured to perform any of the steps of any of the Group A embodiments.

31. The communication system of the previous embodiment, further including the UE.

32. The communication system of the previous 2 embodiments, further including the radio network node, wherein the radio network node comprises a radio interface configured to communicate with the UE and a communication interface configured to forward to the host computer the user data carried by a transmission from the UE to the radio network node.

33. The communication system of the previous 3 embodiments, wherein:
  the processing circuitry of the host computer is configured to execute a host application; and
  the UE's processing circuitry is configured to execute a client application associated with the host application, thereby providing the user data.

34. The communication system of the previous 4 embodiments, wherein:
  the processing circuitry of the host computer is configured to execute a host application, thereby providing request data; and
  the UE's processing circuitry is configured to execute a client application associated with the host application, thereby providing the user data in response to the request data.

35. A method implemented in a communication system including a host computer, a radio network node and a user equipment (UE), the method comprising:
  at the host computer, receiving user data transmitted to the radio network node from the UE, wherein the UE performs any of the steps of any of the Group A embodiments.

36. The method of the previous embodiment, further comprising, at the UE, providing the user data to the radio network node.

37. The method of the previous 2 embodiments, further comprising:
  at the UE, executing a client application, thereby providing the user data to be transmitted; and
  at the host computer, executing a host application associated with the client application.

38. The method of the previous 3 embodiments, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

39. A communication system including a host computer comprising a communication interface configured to receive user data originating from a transmission from a user equipment (UE) to a radio network node, wherein the radio network node comprises a radio interface and processing circuitry, the radio network node's processing circuitry configured to perform any of the steps of any of the Group B embodiments.

40. The communication system of the previous embodiment further including the radio network node.

41. The communication system of the previous 2 embodiments, further including the UE, wherein the UE is configured to communicate with the radio network node.

42. The communication system of the previous 3 embodiments, wherein:
  the processing circuitry of the host computer is configured to execute a host application;
  the UE is configured to execute a client application associated with the host application, thereby providing the user data to be received by the host computer.

43. A method implemented in a communication system including a host computer, a radio network node and a user equipment (UE), the method comprising:
  at the host computer, receiving, from the radio network node, user data originating from a transmission which the radio network node has received from the UE, wherein the UE performs any of the steps of any of the Group A embodiments.

44. The method of the previous embodiment, further comprising at the radio network node, receiving the user data from the UE.

45. The method of the previous 2 embodiments, further comprising at the radio network node, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
  CBRA Contention Based Random Access
  CFRA Contention Free Random Access
  FDM Frequency Division Multiplexing
  GNSS Global Navigation Satellite System
  LBT Listen Before Talk
  NR New radio
  MC Mission Critical
  MIB Master information block
  OFDM Orthogonal Frequency Demultiplexing
  PBCH Physical broadcast channel
  PRACH Physical Random Access Channel
  PUSCH Physical Uplink Shared Channel
  RA Random Access
  RACH Random Access Channel
  RAR Random Access Response
  RO PRACH occasion
  SIB1 System Information Block Type 1
  SS Synchronization Signals
  SSB SS/PBCH block
  TDM Time Division Multiplexing
  1×RTT CDMA2000 1× Radio Transmission Technology
  3GPP 3rd Generation Partnership Project
  5G 5th Generation
  ABS Almost Blank Subframe
  ARQ Automatic Repeat Request
  AWGN Additive White Gaussian Noise
  BCCH Broadcast Control Channel
  BCH Broadcast Channel
  CA Carrier Aggregation
  CC Carrier Component
  CCCH SDU Common Control Channel SDU
  CDMA Code Division Multiplexing Access
  CGI Cell Global Identifier
  CIR Channel Impulse Response
  CP Cyclic Prefix
  CPICH Common Pilot Channel
  CPICH Ec/No CPICH Received energy per chip divided by the power density in the band
  CQI Channel Quality information
  C-RNTI Cell RNTI
  CSI Channel State Information
  DCCH Dedicated Control Channel
  DL Downlink
  DM Demodulation DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, configured to communicate with a network node, the method comprising:

receiving at least one first random access, RA, indicator that indicates information relating to a non-terrestrial network, NTN, access;

determining a random access, RA, procedure to use to access the NTN based at least in part on the at least one first RA indicator;

receiving at least one second RA indicator that indicates information relating to a terrestrial network, TN, access;

based on a first WD capability, determining a second WD capability from a predetermined set of a plurality of capability types, determining the second WD capability comprising at least one of:

determining, based on the first WD capability being a capability to support a 2-step RA procedure, that the second WD capability comprises a capability to perform a random access, RA, procedure to access the NTN without one or both of an uplink time and frequency pre-compensation; and determining, based on the first WD capability being a capability to support a shared spectrum channel access, that the second WD capability comprises a capability to perform a random access, RA, procedure to access the NTN without one or both of an uplink time and frequency pre-compensation; and one or more of:

the at least one first RA indicator being different from the at least one second RA indicator, the at least one second RA indicator being to access to the TN and the NTN;

a first physical random-access channel, PRACH, format to use to access the NTN being different from a second PRACH format to use to access the TN, the second PRACH format being also to access the NTN; or the first RA procedure to use to access the NTN being different from a second RA procedure to use to access the TN, the second RA procedure being also to access the NTN.

2. The method of claim 1, wherein the at least one first RA indicator indicates the first PRACH format to use to access the NTN.

3. The method of claim 1, wherein the at least one first RA indicator indicates the first random access, RA, procedure to use to access the NTN.

4. The method of claim 1, wherein the plurality of capability types comprises one or more of:

a first type indicating that the WD does not support a global navigation satellite system, GNSS;

a second type indicating that the WD supports the GNSS and is incapable of one or both of uplink time and frequency pre-compensation before initiating a random access, RA, procedure; and a third type indicating that the WD supports the GNSS and is capable of one of both of uplink time and frequency pre-compensation before initiating the RA procedure.

5. The method of claim 1, wherein the at least one first RA indicator comprises a parameter that identifies a PRACH format to use to access the NTN and an RA procedure to use to access the NTN, the parameter being a part of a predetermined set of a plurality of parameters.

6. The method of claim 5, wherein the plurality of parameters comprises one or more of:

a first parameter that identifies a first PRACH format to use to access the NTN and a first RA procedure to use to access the NTN, the first PRACH format being specific to the NTN access and the first RA procedure being also for a terrestrial network, TN;

a second parameter that identifies a second PRACH format to use to access the NTN and a second RA procedure to use to access the NTN, the second PRACH format being also for TN access and the second RA procedure being specific to NTN access; and a third PRACH format to use to access the NTN and a third RA procedure to use to access the NTN, the third PRACH format being specific to NTN access and the third RA procedure being specific to NTN access.

7. The method of claim 6, wherein one or more of:

one or both of the first and third PRACH formats that are specific to the NTN access are based on two Zadoff-Chu sequences;

the second PRACH format that is also for TN access is based on a single Zadoff-Chu sequence;

one or both of the second and third RA procedures that are specific to the NTN access comprise a modification to an RA procedure for TN access; and the first RA procedure that is also for TN access is one of a 4-step and a 2-step RA procedure.

8. The method of claim 7, wherein the modification comprises one of both of an uplink time and frequency pre-compensation to be performed before initiation of the RA procedure.

9. The method of claim 1, wherein at least one of the at least one first RA indicator that indicates information relating to the NTN access is received in one of:

a radio resource control, RRC, signaling;

a cell specific signaling; and a WD specific signaling.

10. The method of claim 1, wherein the at least one first RA indicator comprises a first information that is broadcasted in system information, SI, and a second information that indicates a physical random access channel, PRACH, configuration that is specific to the NTN access.

11. The method of claim 10, wherein the first information that is broadcasted in the SI indicates whether WDs with a global navigation satellite system, GNSS, capability are allowed to use the PRACH configuration that is specific to the NTN access.

12. The method of claim 1, wherein the at least one first RA indicator comprises information that indicates whether a serving cell provided by the network node supports a NTN specific random access, RA, type.

13. The method of claim 1, wherein the at least one first RA indicator comprises information that indicates a common physical random access channel, PRACH, configuration within at least one of a common PRACH configuration information element, IE, and a bandwidth part, BWP, uplink common information element, IE.

14. A wireless device, WD, comprising processing circuitry, the processing circuitry configured to cause the WD to:

receive at least one first random access, RA, indicator that indicates information relating to a non-terrestrial network, NTN, access;

determine a first random access, RA, procedure to use to access the NTN based at least in part on the at least one first RA indicator;

receive at least one second RA indicator that indicates information relating to a terrestrial network, TN, access;

based on a first WD capability, determining a second WD capability from a predetermined set of a plurality of capability types, determining the second WD capability comprising at least one of:

determining, based on the first WD capability being a capability to support a 2-step RA procedure, that the second WD capability comprises a capability to perform a random access, RA, procedure to access the NTN without one or both of an uplink time and frequency pre-compensation; and determining, based on the first WD capability being a capability to support a shared spectrum channel access, that the second WD capability comprises a capability to perform a random access, RA, procedure to access the NTN without one or both of an uplink time and frequency pre-compensation; and one or more of:

the at least one first RA indicator being different from the at least one second RA indicator, the at least one second RA indicator being to access to the TN and the NTN;

a first physical random-access channel, PRACH, format to use to access the NTN being different from a second PRACH format to use to access the TN, the second PRACH format being also to access the NTN; or the first RA procedure to use to access the NTN being different from a second RA procedure to use to access the TN, the second RA procedure being also to access the NTN.

* * * * *